United States Patent
Goyal et al.

(10) Patent No.: US 8,514,265 B2
(45) Date of Patent: Aug. 20, 2013

(54) SYSTEMS AND METHODS FOR SELECTING VIDEOCONFERENCING ENDPOINTS FOR DISPLAY IN A COMPOSITE VIDEO IMAGE

(75) Inventors: Ashish Goyal, Bangalore (IN); Hrishikesh Gopal Kulkarni, Bangalore (IN); Shantha Kumari Harohalli Sathyanarayana Rao, Bangalore (IN)

(73) Assignee: LifeSize Communications, Inc., Austin, TX (US)

( * ) Notice: Subject to any disclaimer, the term of this patent is extended or adjusted under 35 U.S.C. 154(b) by 1357 days.

(21) Appl. No.: 12/244,436

(22) Filed: Oct. 2, 2008

(65) Prior Publication Data
US 2010/0085419 A1 Apr. 8, 2010

(51) Int. Cl.
*H04N 7/14* (2006.01)
*G06F 3/048* (2006.01)
*G06F 3/00* (2006.01)
*G06F 15/16* (2006.01)

(52) U.S. Cl.
USPC ........ 348/14.09; 715/755; 715/756; 715/759; 709/205

(58) Field of Classification Search
USPC ................... 348/14.08, 14.09; 709/204, 205; 715/751, 753, 755, 756, 759
See application file for complete search history.

(56) References Cited

U.S. PATENT DOCUMENTS

| | | | |
|---|---|---|---|
| 4,449,238 A | 5/1984 | Lee et al. | |
| 5,365,265 A | 11/1994 | Shibata et al. | |
| 5,398,309 A | 3/1995 | Atkins et al. | |
| 5,453,780 A | 9/1995 | Chen et al. | |
| 5,528,740 A | 6/1996 | Hill et al. | |
| 5,534,914 A | 7/1996 | Flohr et al. | |
| 5,537,440 A | 7/1996 | Eyuboglu et al. | |
| 5,572,248 A | 11/1996 | Allen et al. | |
| 5,594,859 A | 1/1997 | Palmer et al. | |
| 5,600,646 A | 2/1997 | Polomski | |
| 5,617,539 A | 4/1997 | Ludwig et al. | |
| 5,625,410 A | 4/1997 | Washino et al. | |
| 5,629,736 A | 5/1997 | Haskell et al. | |
| 5,640,543 A | 6/1997 | Farrell et al. | |
| 5,649,055 A | 7/1997 | Gupta et al. | |
| 5,657,096 A | 8/1997 | Lukacs | |

(Continued)

OTHER PUBLICATIONS

"Polycom MGC Administrator's Guide Version 8.0"; http://www.firstconnections.co.uk/downloads/polycom/Polycom%20MGC%20Administrators%20Guide%20Version%208.0.pdf; 2006; pp. 1-14, 185-392.

(Continued)

*Primary Examiner* — Christopher M Brandt
(74) *Attorney, Agent, or Firm* — Meyertons Hood Kivlin Kowert & Goetzel, P.C.; Jeffrey C. Hood

(57) ABSTRACT

In some embodiments, a videoconferencing endpoint may be an MCU (Multipoint Control Unit) or may include embedded MCU functionality. In various embodiments, the endpoint may thus conduct a videoconference by receiving/compositing video and audio from multiple videoconference endpoints. The endpoint may select a subset of endpoints and form a composite video image from the subset of the videoconference endpoints to send to the other videoconference endpoints. In some embodiments, the subset of endpoints that are selected for compositing into the composite video image may be selected according to criteria such as the last N talking participants. In some embodiments, the master endpoint may request the non-talker endpoints to stop sending video to help conserve the resources on the master endpoint. In some embodiments, the master endpoint may ignore video from endpoints that are not being displayed.

21 Claims, 16 Drawing Sheets

(56) References Cited

U.S. PATENT DOCUMENTS

| | | | |
|---|---|---|---|
| 5,684,527 A | 11/1997 | Terui et al. | |
| 5,689,641 A | 11/1997 | Ludwig et al. | |
| 5,719,951 A | 2/1998 | Shackleton et al. | |
| 5,737,011 A | 4/1998 | Lukacs | |
| 5,751,338 A | 5/1998 | Ludwig, Jr. | |
| 5,764,277 A | 6/1998 | Loui et al. | |
| 5,767,897 A | 6/1998 | Howell | |
| 5,768,263 A | 6/1998 | Tischler et al. | |
| 5,812,789 A | 9/1998 | Diaz et al. | |
| 5,821,986 A | 10/1998 | Yuan et al. | |
| 5,831,666 A | 11/1998 | Palmer et al. | |
| 5,838,664 A | 11/1998 | Polomski | |
| 5,859,979 A | 1/1999 | Tung et al. | |
| 5,870,146 A | 2/1999 | Zhu | |
| 5,896,128 A | 4/1999 | Boyer | |
| 5,914,940 A | 6/1999 | Fukuoka et al. | |
| 5,991,277 A | 11/1999 | Maeng et al. | |
| 5,995,608 A | 11/1999 | Detampel, Jr. et al. | |
| 6,025,870 A | 2/2000 | Hardy | |
| 6,038,532 A | 3/2000 | Kane et al. | |
| 6,043,844 A | 3/2000 | Bist et al. | |
| 6,049,694 A | 4/2000 | Kassatly | |
| 6,078,350 A | 6/2000 | Davis | |
| 6,101,480 A | 8/2000 | Conmy et al. | |
| 6,122,668 A | 9/2000 | Teng et al. | |
| 6,243,129 B1 | 6/2001 | Deierling | |
| 6,285,661 B1 | 9/2001 | Zhu et al. | |
| 6,288,740 B1 | 9/2001 | Lai et al. | |
| 6,292,204 B1 | 9/2001 | Carleton et al. | |
| 6,300,973 B1 | 10/2001 | Feder et al. | |
| 6,373,517 B1 | 4/2002 | Davis et al. | |
| 6,453,285 B1 | 9/2002 | Anderson et al. | |
| 6,480,823 B1 | 11/2002 | Zhao et al. | |
| 6,496,216 B2 | 12/2002 | Feder et al. | |
| 6,526,099 B1 | 2/2003 | Christopoulos et al. | |
| 6,535,604 B1 | 3/2003 | Provencal et al. | |
| 6,564,380 B1 | 5/2003 | Murphy | |
| 6,594,688 B2 | 7/2003 | Ludwig et al. | |
| 6,603,501 B1 | 8/2003 | Parry et al. | |
| 6,646,997 B1 | 11/2003 | Baxley et al. | |
| 6,654,045 B2 | 11/2003 | Allen et al. | |
| 6,657,975 B1 | 12/2003 | Baxley et al. | |
| 6,728,221 B1 | 4/2004 | Shaffer et al. | |
| 6,744,460 B1 | 6/2004 | Nimri et al. | |
| 6,757,005 B1 | 6/2004 | Elbaz et al. | |
| 6,760,415 B2 | 7/2004 | Beecroft | |
| 6,816,904 B1 | 11/2004 | Ludwig et al. | |
| 7,034,860 B2 * | 4/2006 | Lia et al. | 348/14.09 |
| 7,089,285 B1 | 8/2006 | Drell | |
| 7,312,809 B2 | 12/2007 | Bain et al. | |
| 7,353,251 B1 | 4/2008 | Balakrishnan | |
| 7,477,282 B2 | 1/2009 | Firestone et al. | |
| 7,542,068 B2 * | 6/2009 | Eshkoli et al. | 348/14.08 |
| 7,668,907 B1 * | 2/2010 | Janakiraman et al. | 709/204 |
| 8,289,363 B2 * | 10/2012 | Buckler | 348/14.08 |
| 2002/0033880 A1 * | 3/2002 | Sul et al. | 348/14.09 |
| 2002/0188731 A1 | 12/2002 | Potekhin et al. | |
| 2003/0174146 A1 | 9/2003 | Kenoyer | |
| 2004/0113939 A1 | 6/2004 | Zacks et al. | |
| 2004/0183897 A1 | 9/2004 | Kenoyer et al. | |
| 2005/0099492 A1 * | 5/2005 | Orr | 348/14.08 |
| 2006/0013416 A1 | 1/2006 | Truong et al. | |
| 2006/0023062 A1 * | 2/2006 | Elbaze et al. | 348/14.09 |
| 2007/0165820 A1 * | 7/2007 | Krantz et al. | 379/202.01 |
| 2007/0242129 A1 * | 10/2007 | Ferren et al. | 348/14.01 |
| 2008/0100696 A1 * | 5/2008 | Schirdewahn | 348/14.09 |
| 2008/0165245 A1 * | 7/2008 | Sarkar et al. | 348/14.09 |
| 2008/0231687 A1 * | 9/2008 | Baird et al. | 348/14.09 |
| 2008/0273079 A1 * | 11/2008 | Campbell et al. | 348/14.08 |
| 2009/0015659 A1 * | 1/2009 | Choi | 348/14.09 |
| 2009/0089683 A1 * | 4/2009 | Thapa | 715/756 |
| 2009/0160929 A1 * | 6/2009 | Wu et al. | 348/14.09 |
| 2009/0268008 A1 * | 10/2009 | Topits | 348/14.09 |
| 2010/0002069 A1 * | 1/2010 | Eleftheriadis et al. | 348/14.08 |

OTHER PUBLICATIONS

"Codian HD Endpoint Interoperability Guide, Version 1.2"; Codian; Sep. 2006; 14 pages.

"Codian MCU 4200 Series User Guide"; Codian Ltd.; Mar. 2006; 113 pages.

Frank Rodriguez; "Polycom MGC 25/50/100 Continuous Presence (CP) Layouts"; Polycom Network Systems; Jul. 15, 2005; 4 pages.

"Polycom MGC-25 Frequently Asked Questions"; Jun. 2003; 2 pages.

"Polycom MGC-25 Technical Specifications"; Jun. 2003; 4 pages.

"Codian MCU 4200 Series User Manual"; Codian Ltd.; Feb. 2005; 85 pages.

"Polycom VideoPlus Continuous Presence"; Oct. 2004; 2 pages.

"A history of video conferencing (VC) technology" http://web.archive.org/web/20030622161425/http://myhome.hanafos.com/~soonjp/vchx.html (web archive dated Jun. 22, 2003); 5 pages.

"MediaMax Operations Manual"; May 1992; 342 pages; VideoTelecom; Austin, TX.

"MultiMax Operations Manual"; Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System"; Multimedia '02; Dec. 2002; 10 pages; Microsoft Research; Redmond, WA.

P. H. Down; "Introduction to Videoconferencing"; http://www.video.ja.net/intro/; 2001; 26 pages.

Louis C. Yun and David G. Messerschmitt; "Architectures for Multi-Source Multi-User Video Compositing"; 1993; 9 pages; University of California at Berkley, Berkley CA.

"Polycom VideoPlus Continuous Presence"; Brochure; 2004; 3 pages; Pleasanton, CA.

Peter Klein; "Video Workplace Conference"; IEEE Proceedings of Globecom; 1985; pp. 109-112; Siemens AG, Germany.

"Videoconferencing Educational Technology—Basic Functions of the Polycom Remote Control Unit"; http://www.medlib.iupui.edu/techsupport/vc/vcinstructions.html; 2002; 3 pages.

E. J. Addeo, A. D. Gelman and A. B. Dayao; "A Multi-media Multi-point Communication Services Capability for Broadband Networks"; Mar. 1987; pp. 423-428; Bell Communications Research; Morristown, NJ.

E. F. Brown, J. O. Limb and B. Prasada; "A Continuous Presence Video Conferencing System"; National Telecommunications Conference Record; Dec. 1978; 5 pages; vol. 1.

Armando Fox, Steven D. Gribble, Eric A. Brewer, and Elan Amir; "Adapting to Network and Client Variability via On-Demand Dynamic Distillation" Proceedings of the seventh international conference on Architectural support for programming languages and operating systems;1996; pp. 160-170.

Robert D. Gaglianello and Glenn L. CASH; "Montage: Continuous Presence Teleconferencing Utilizing Compressed Domain Video Bridging"; IEEE International Conference on Communication; Jun. 1995; pp. 572-581; AT&T Bell Laboratories.

A.B. Larsen and E.F. Brown; "'Continuous Presence' Video Conferencing at 1.5-6 Mb/sec"; Teleconferencing and Interactive Media, University of Wisconsin Extension Center for Interactive Programs; 1980; 8 pages.

Michael E. Lukacs; "The Personal Presence System—Hardware Architecture", Proceedings of the Second ACM International Conference on Multimedia; Oct. 1994; pp. 69-76; Bell Communications Research.

Shigeki Masaki, Hiroyuki Yamaguchi Hideya Ichihara and Kazunori Shimamura; "A Desktop Teleconferencing Terminal Based on B-ISDN: PMTC"; NTT Review; Jul. 1992; pp. 81-85; vol. 4, No. 4.

Shaker Sabri and Birendra Prasada; "Video Conferencing Systems"; Proceedings of the IEEE; Apr. 1985; pp. 671-688; vol. 74, Issue 4.

Christoph Weiss; "Desk Top Video Conferencing—An Important Feature of Future Visual Communications"; IEEE International Conference on Communications; Apr. 1990; pp. 134-139; vol. 1.

Marc H. Willebeek-Lemair and Zon-Yin Shae; "Videoconferencing over Packet-Based Networks" IEEE Journal on Selected Ares in Communications; Aug. 1997; 1101-1114; vol. 15, No. 6.

Elan Amir, Steven McCanne, and Hui Zhang; "An Application Level Video Gateway"; In Proceedings of ACM Multimedia '95; 1995; 18 pages.

Horng-Dar Lin and David G. Messerschmitt; "Video Composition Methods and Their Semantics"; International Conference on Acoustics, Speech, and Signal Processing; Apr. 1991; pp. 2833-2836; vol. 4.

"Polycom Executive Collection"; Jun. 2003; 4 pages; Polycom, Inc.; Pleasanton, CA.

Joe Duran and Charlie Sauer; "Mainstream Videoconferencing—A Developer's Guide to Distance Multimedia"; Jan. 1997; pp. 73-74; Addison Wesley Longman, Inc.

Gong, Fengmin; "Multipoint Audio and Video Control for Packet-Based Multimedia Conferencing"; Proceedings of the 2nd Association for Computing Machinery International Conference on Multimedia; San Francisco, CA; 1994; pp. 425-432.

U.S. Appl. No. 11/252,238; Michael L. Kenoyer and Michael V. Jenkins; "Video conferencing system transcoder"; filed Oct. 17, 2005.

U.S. Appl. No. 11/405,372; Wayne E. Mock and Michael L. Kenoyer; "Live video icons for signal selection in a videoconferencing system"; filed Apr. 17, 2006.

U.S. Appl. No. 11/348,217; Michael L. Kenoyer; "Controlling video display mode in a videoconferencing system"; filed Feb. 6, 2006.

U.S. Appl. No. 11/693,074; Randall D. Groves, Michael L. Kenoyer and Craig B. Malloy; "Distributed Videoconferencing Processing"; filed Mar. 29, 2007.

U.S. Appl. No. 12/142,263; Keith C. King and Wayne E. Mock; "Virtual decoders"; filed Jun. 19, 2008.

U.S. Appl. No. 12/142,302; Keith C. King and Wayne E. Mock; "Video Conferencing System which Allows Endpoints to Perform Continuous Presence Layout Selection"; filed Jun. 19, 2008.

U.S. Appl. No. 12/142,340; Keith C. King and Wayne E. Mock; "Video Conferencing Device which Performs Multi-way Conferencing"; filed Jun. 19, 2008.

U.S. Appl. No. 12/142,377; Keith C. King and Wayne E. Mock; "Video Decoder which Processes Multiple Video Streams"; filed Jun. 19, 2008.

U.S. Appl. No. 12/171,358; Keith C. King and Wayne E. Mock; "Virtual Multiway Scaler Compensation"; filed Jul. 11, 2008.

U.S. Appl. No. 11/858,342; Matthew K. Brandt; "Videoconferencing System Discovery"; filed Sep. 20, 2007.

U.S. Appl. No. 61/157,511; Keith C. King, Ashish Goyal, and Hrishikesh Gopal Kulkarni; "Virtual Distributed Multipoint Control Unit"; filed Mar. 4, 2009.

U.S. Appl. No. 61/157,516; Keith C. King, Matthew K. Brandt, and Wayne E. Mock; "Videoconferencing Endpoint Extension"; filed Mar. 4, 2009.

U.S. Appl. No. 12/244,436; Ashish Goyal, Hrishikesh Gopal Kulkarni, and Shantha Kumari Harohalli Sathyanarayana Rao; Systems and Methods for Selecting Videoconferencing Endpoints for Display in a Composite Video Image; filed Oct. 2, 2008.

* cited by examiner

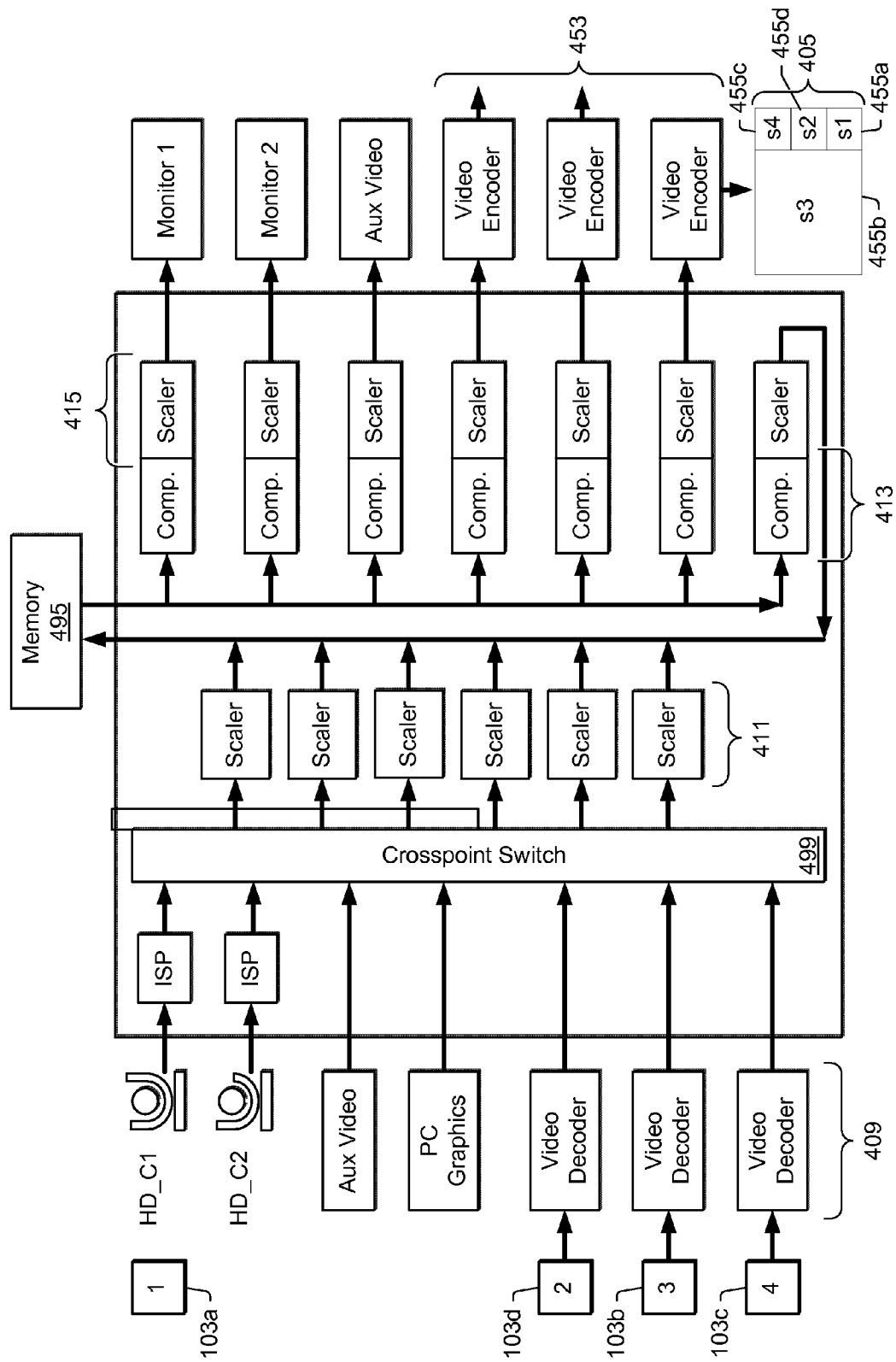

Endpoint (time since last voice)

Endpoint C (0:01) ─ 603
Endpoint A (0:07)    To Display
Endpoint B (0:10)
Endpoint F (0:13)

Endpoint E (0:15)
Endpoint D (0:15) ─ 601
Endpoint G (0:15)
Endpoint H (0:15)

FIG. 6a

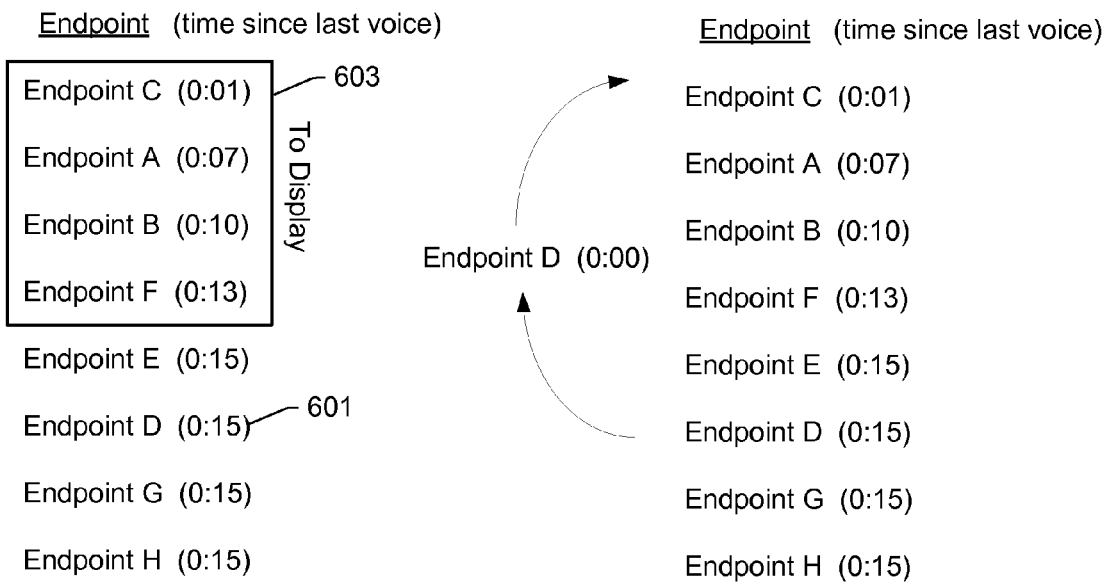

Endpoint (time since last voice)

Endpoint C (0:01)
Endpoint A (0:07)
Endpoint B (0:10)
Endpoint F (0:13)
Endpoint E (0:15)
Endpoint D (0:15)
Endpoint G (0:15)
Endpoint H (0:15)

FIG. 6b

Endpoint (time since last voice)

Endpoint D (0:00) ─ 605
Endpoint C (0:02)    To Display
Endpoint A (0:08)
Endpoint B (0:11)

Endpoint F (0:14)
Endpoint E (0:16)
Endpoint G (0:16)
Endpoint H (0:16)

FIG. 6c

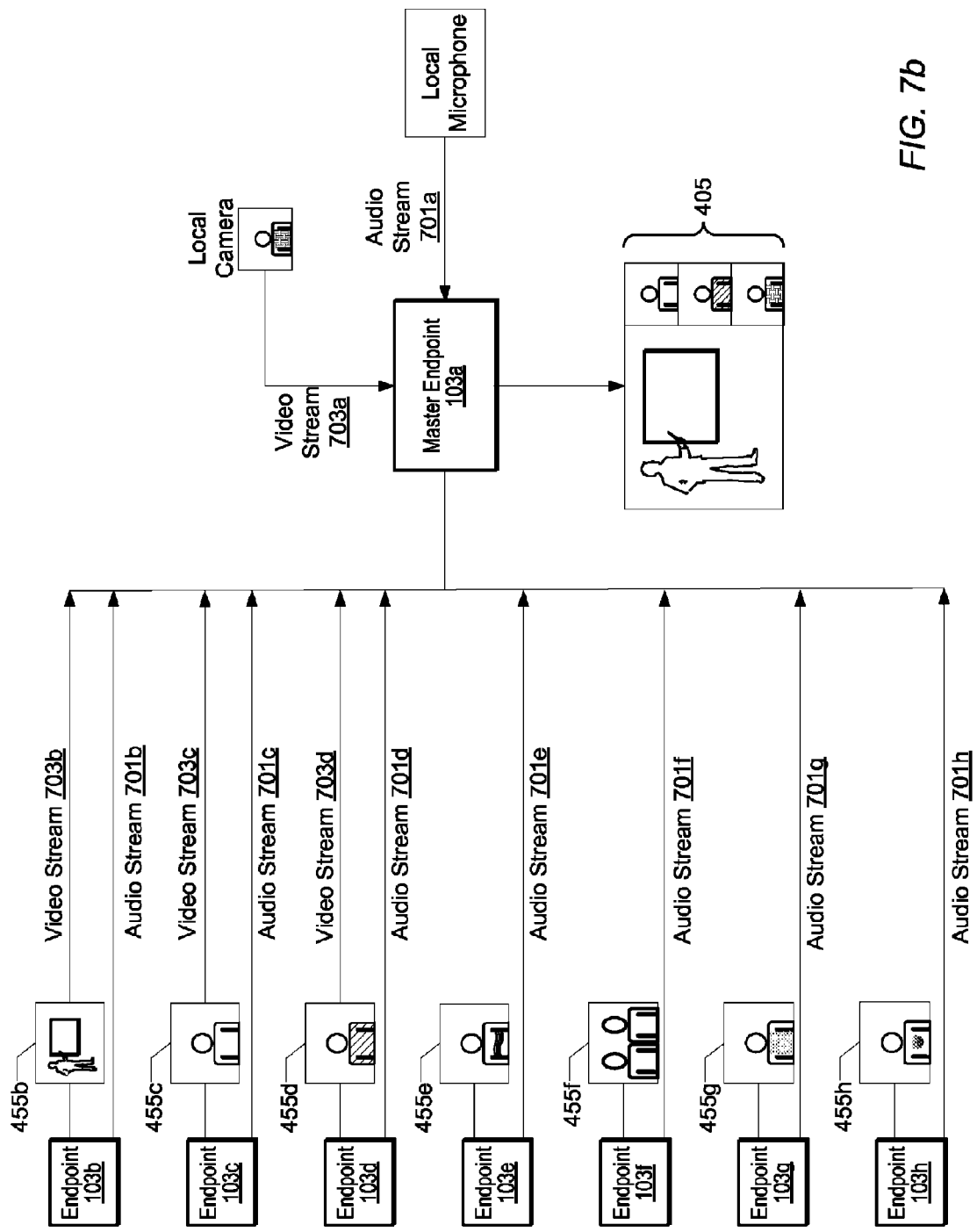

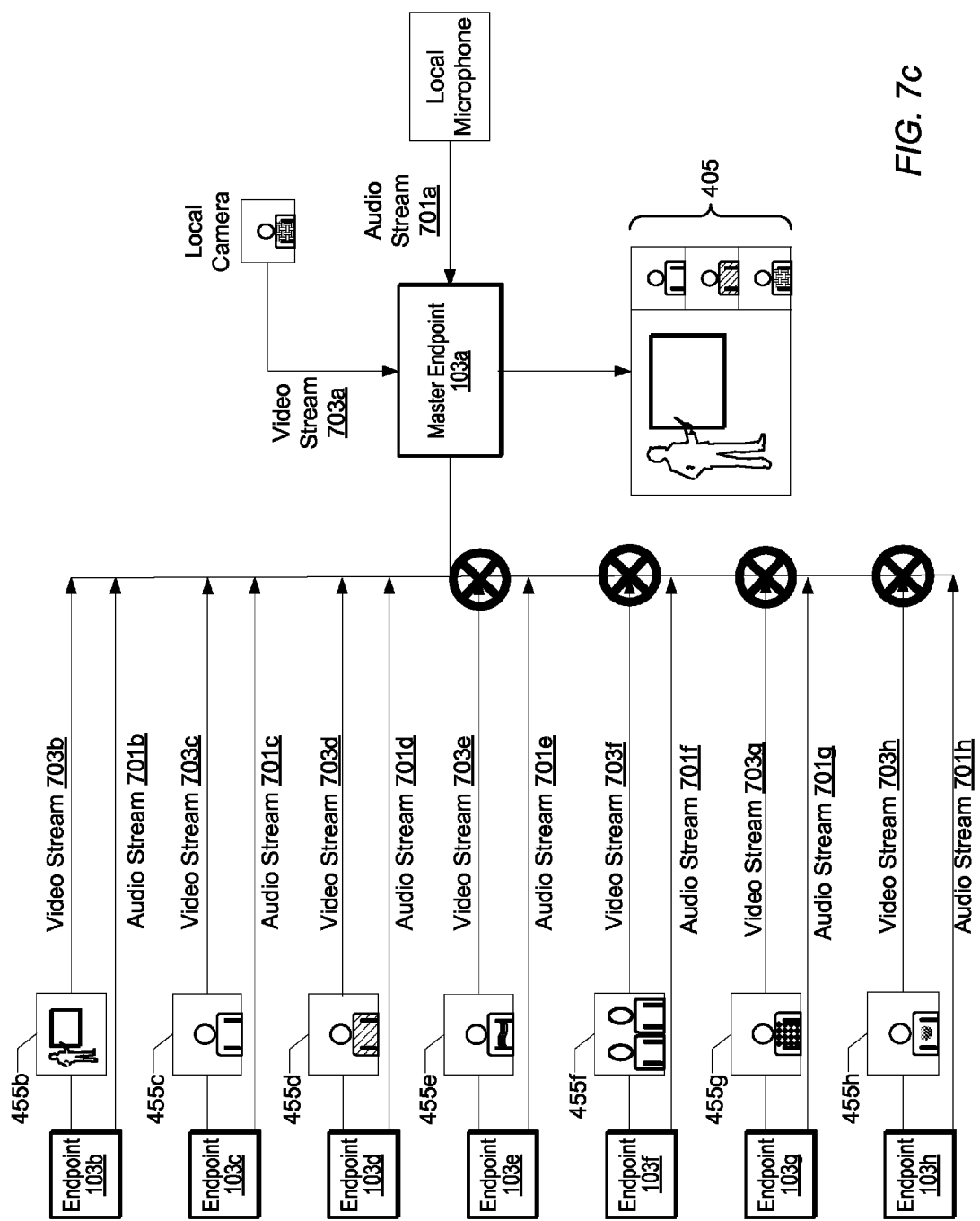

SYSTEMS AND METHODS FOR SELECTING VIDEOCONFERENCING ENDPOINTS FOR DISPLAY IN A COMPOSITE VIDEO IMAGE

BACKGROUND

1. Field of the Invention

The present invention relates generally to conferencing and, more specifically, to videoconferencing.

2. Description of the Related Art

Videoconferencing may be used to allow two or more participants at remote locations to communicate using both video and audio. Each participant location may include a videoconferencing endpoint for video/audio communication with other participants. Each videoconferencing endpoint may include a camera and microphone to collect video and audio from a local participant to send to another (remote) participant. Each videoconferencing endpoint may further include a display and speaker to reproduce video and audio received from a remote participant. Each videoconferencing endpoint may also be coupled to a computer system to allow additional functionality into the videoconference. For example, additional functionality may include data conferencing (including displaying and/or modifying a document for two or more participants during the videoconference).

Videoconferencing may involve transmitting video streams between videoconferencing endpoints. The video streams transmitted between the videoconferencing endpoints may include video frames. The video frames may include pixel macroblocks that may be used to construct video images for display in the videoconferences. Video frame types may include intra-frames, forward predicted frames, and bi-directional predicted frames. These frame types may involve different types of encoding and decoding to construct video images for display. Currently, in a multi-way videoconference, a multipoint control unit (MCU) is used to composite video images received from the videoconferencing endpoints onto video frames of a video stream that may be encoded and transmitted to the various videoconferencing endpoints for display.

SUMMARY

In some embodiments, a videoconferencing endpoint may be an MCU (Multipoint Control Unit) or may include MCU functionality (e.g., the endpoint may be a standalone MCU (e.g., a standalone bridge MCU) or may include embedded MCU functionality). In various embodiments, the endpoint may thus conduct a videoconference by receiving video and audio from multiple videoconference endpoints. In some embodiments, the endpoint conducting the videoconference (the "master endpoint") may operate as an MCU during the videoconference and may also be capable of receiving local video/audio from local participants. The master endpoint may form a composite video image from a subset of the videoconference endpoints and send the composite video image to the other videoconference endpoints. In some embodiments, the subset of endpoints that are selected for compositing into the composite video image may be selected according to criteria such as the last N talking participants (other criteria may also be used). In some embodiments, the master endpoint may request the endpoints not being displayed to stop sending video to help conserve the resources on the master endpoint. In some embodiments, the master endpoint may ignore (e.g., not decode) video streams from endpoints that are not being displayed.

In some embodiments, the master endpoint may automatically alter the composite video image based on talker detection. For example, as new talkers are detected the new talker endpoints may be displayed and currently displayed endpoints may be removed from the display (e.g., currently displayed endpoints with the longest delay since the last detected voice). In some embodiments, the master endpoint may make the dominant talker endpoint's video appear in a larger pane than the other displayed endpoints video. Displaying only the last N talking participants (instead of all of the participants) may allow the master endpoint to support more participants in the videoconference than the number of encoders/decoders available on the master endpoint. In some embodiments, limiting the number of participants displayed concurrently may also reduce clutter on the display. In some embodiments, reducing the number of video images in the composite video image may also allow the master endpoint to scale up the video images in the composite video image (instead of, for example, displaying more video images at lower resolutions to fit the images in the same composite video image).

BRIEF DESCRIPTION OF THE DRAWINGS

A better understanding of the present invention may be obtained when the following detailed description is considered in conjunction with the following drawings, in which:

FIGS. 4a-d illustrates an endpoint transmitting a video frame comprising a composite video image, according to an embodiment.

FIGS. 6a-c illustrate a list and timers for tracking last N talkers, according to an embodiment.

FIGS. 7a-d illustrate audio and video streams in a videoconference, according to an embodiment.

Figure 1:
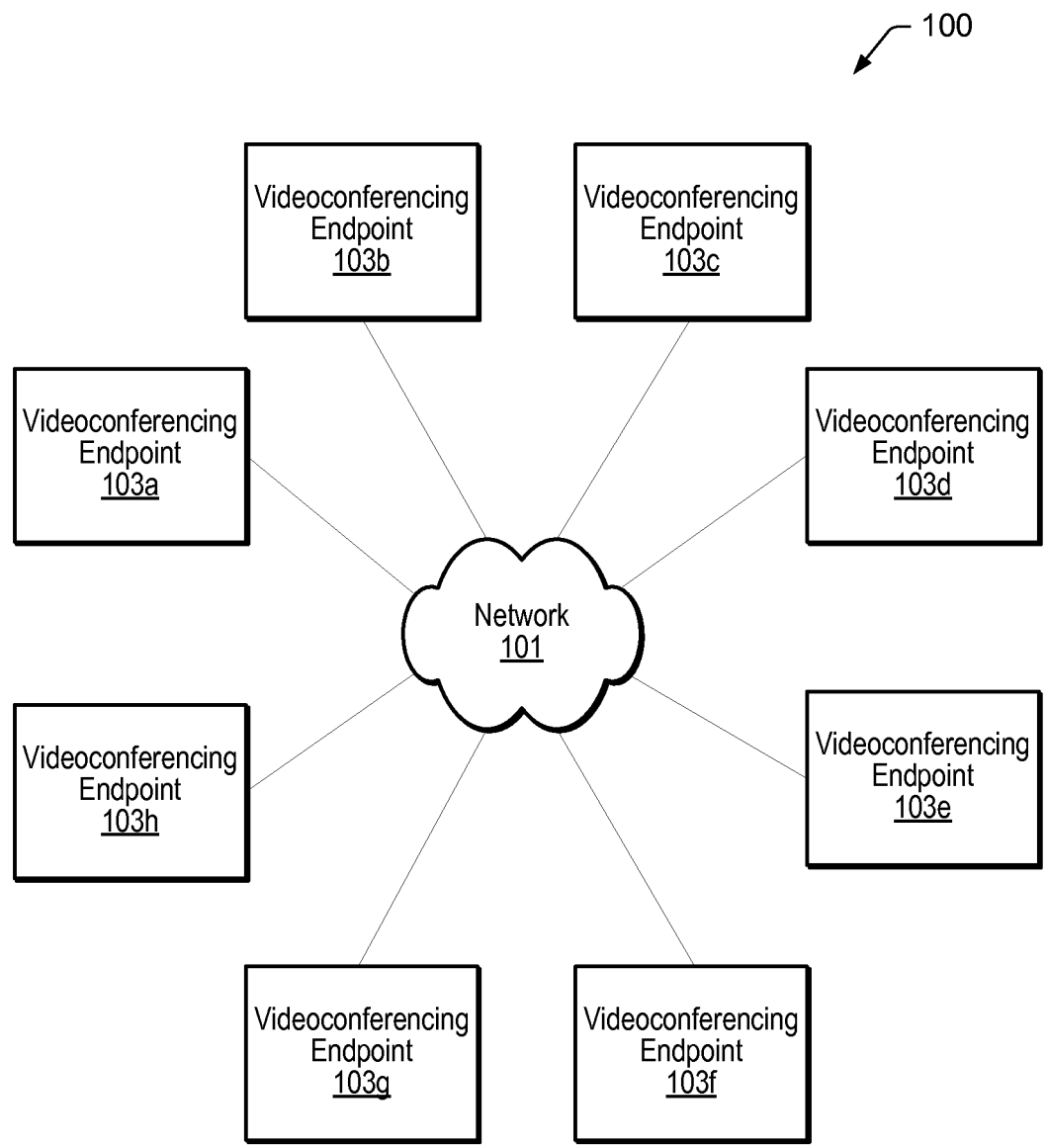
FIG. 1 illustrates a videoconferencing endpoint network, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. patent application titled "Speakerphone", Ser. No. 11/251,084, which was filed Oct. 14, 2005, whose inventor is William V. Oxford is hereby incorporated by reference in its entirety as though fully and completely set forth herein.

U.S. patent application titled "Videoconferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

U.S. patent application titled "Speakerphone Supporting Video and Audio Features", Ser. No. 11/251,086, which was filed Oct. 14, 2005, whose inventors are Michael L. Kenoyer, Craig B. Malloy and Wayne E. Mock is hereby incorporated by reference in its entirety as though fully and completely set forth herein.

U.S. patent application titled "Virtual Decoders", Ser. No. 12/142,263, which was filed Jun. 19, 2008, whose inventors are Keith C. King and Wayne E. Mock, is hereby incorporated by reference in its entirety as though fully and completely set forth herein.

U.S. patent application titled "Video Conferencing System which Allows Endpoints to Perform Continuous Presence Layout Selection", Ser. No. 12/142,302, which was filed Jun. 19, 2008, whose inventors are Keith C. King and Wayne E. Mock, is hereby incorporated by reference in its entirety as though fully and completely set forth herein.

U.S. patent application titled "Video Conferencing Device which Performs Multi-way Conferencing", Ser. No. 12/142,340, which was filed Jun. 19, 2008, whose inventors are Keith C. King and Wayne E. Mock, is hereby incorporated by reference in its entirety as though fully and completely set forth herein.

U.S. patent application titled "Video Decoder which Processes Multiple Video Streams", Ser. No. 12/142,377, which was filed Jun. 19, 2008, whose inventors are Keith C. King and Wayne E. Mock, is hereby incorporated by reference in its entirety as though fully and completely set forth herein.

U.S. patent application titled "Virtual Multiway Scaler Compensation", Ser. No. 12/171,358, which was filed Jul. 11, 2008, whose inventors are Keith C. King and Wayne E. Mock, is hereby incorporated by reference in its entirety as though fully and completely set forth herein.

U.S. patent application titled "Integrated Videoconferencing System", Ser. No. 11/405,686, which was filed Apr. 17, 2006, whose inventors are Michael L. Kenoyer, Patrick D. Vanderwilt, Craig B. Malloy, William V. Oxford, Wayne E. Mock, Jonathan I. Kaplan, and Jesse A. Fourt is hereby incorporated by reference in its entirety as though fully and completely set forth herein.

FIG. 1 illustrates an embodiment of videoconferencing endpoint network 100. FIG. 1 illustrates an exemplary embodiment of videoconferencing endpoint network 100 that may include network 101 and multiple endpoints 103a-103h (e.g., videoconferencing endpoints). While endpoints 103a-h are shown in FIG. 1, videoconferencing endpoint network 100 may include more or fewer endpoints 103. Although not shown in FIG. 1, videoconferencing system network 100 may also include other devices, such as gateways, a service provider, and plain old telephone system (POTS) telephones, among others. Endpoints 103a-103h may be coupled to network 101 via gateways (not shown). Gateways may each include firewall, network address translation (NAT), packet filter, and/or proxy mechanisms, among others.

Endpoints 103a-103h may include videoconferencing system endpoints (also referred to as "participant locations"). Each endpoint 103a-103h may include a camera, display device, microphone, speakers, and a codec or other type of videoconferencing hardware. In some embodiments, endpoints 103a-103h may include video and voice communications capabilities (e.g., videoconferencing capabilities) and include or be coupled to various audio devices (e.g., microphones, audio input devices, speakers, audio output devices, telephones, speaker telephones, etc.) and include or be coupled to various video devices (e.g., monitors, projectors, displays, televisions, video output devices, video input devices, cameras, etc.). In some embodiments, endpoints 103a-103h may include various ports for coupling to one or more devices (e.g., audio devices, video devices, etc.) and/or to one or more networks. Endpoints 103a-103h may each include and/or implement one or more real time protocols, e.g., session initiation protocol (SIP), H.261, H.263, H.264, H.323, among others. In an embodiment, endpoints 103a-103h may implement H.264 encoding for high definition (HD) video streams.

Network 101 may include a wide area network (WAN) such as the Internet. Network 101 may include a plurality of networks coupled together, e.g., one or more local area networks (LANs) coupled to the Internet. Network 101 may also include public switched telephone network (PSTN). Network 101 may also include an Integrated Services Digital Network (ISDN) that may include or implement H.320 capabilities. In various embodiments, video and audio conferencing may be implemented over various types of networked devices.

In some embodiments, endpoints 103a-103h may each include various wireless or wired communication devices that implement various types of communication, such as wired Ethernet, wireless Ethernet (e.g., IEEE 802.11), IEEE 802.16, paging logic, RF (radio frequency) communication logic, a modem, a digital subscriber line (DSL) device, a cable (television) modem, an ISDN device, an ATM (asynchronous transfer mode) device, a satellite transceiver device, a parallel or serial port bus interface, and/or other type of communication device or method.

In various embodiments, the methods and/or systems described may be used to implement connectivity between or among two or more participant locations or endpoints, each having voice and/or video devices (e.g., endpoints 103a-103h) that communicate through network 101.

In some embodiments, videoconferencing system network 100 (e.g., endpoints 103a-h) may be designed to operate with network infrastructures that support T1 capabilities or less, e.g., 1.5 mega-bits per second or less in one embodiment, and 2 mega-bits per second in other embodiments. In some embodiments, other capabilities may be supported (e.g., 6 mega-bits per second, over 10 mega-bits per second, etc). The videoconferencing endpoint may support HD capabilities. The term "high resolution" includes displays with resolution of 1280×720 pixels and higher. In one embodiment, high-definition resolution may include 1280×720 progressive scans at 60 frames per second, or 1920×1080 interlaced or 1920×1080 progressive. Thus, an embodiment of the present invention may include a videoconferencing endpoint with HD "e.g. similar to HDTV" display capabilities using network infrastructures with bandwidths T1 capability or less. The term "high-definition" is intended to have the full breath of its ordinary meaning and includes "high resolution".

Figure 2:
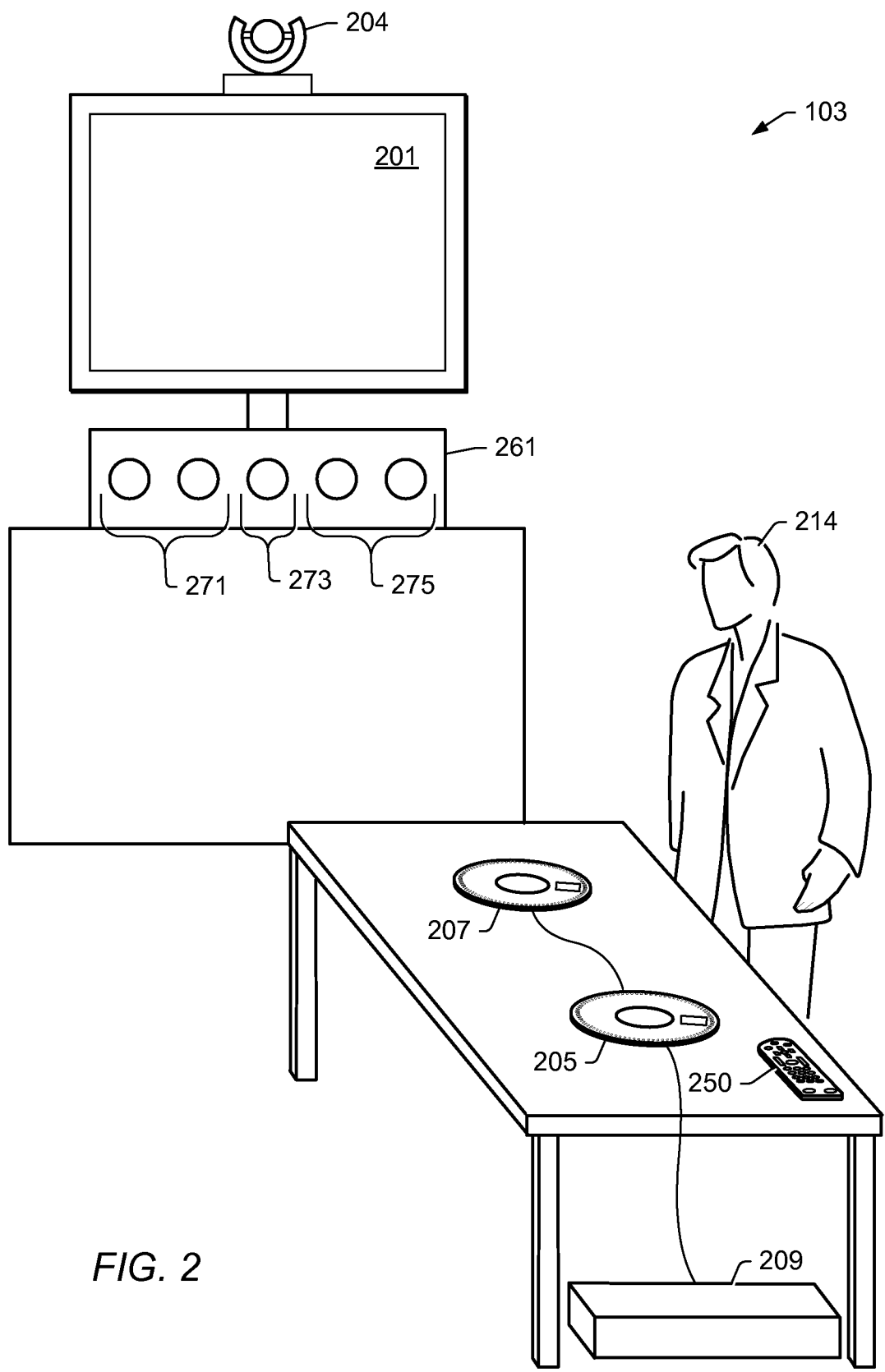
FIG. 2 illustrates a videoconferencing endpoint, according to an embodiment.

FIG. 2 illustrates an exemplary embodiment of videoconferencing endpoint 103 ("103" used herein to refer generally to an endpoint of endpoints 103a-h), also referred to as a participant location. Endpoint 103 may have system codec box 209 to manage both speakerphones 205/207 and the videoconferencing devices. Speakerphones 205/207 and other videoconferencing endpoint components may be coupled to codec box 209 and may receive audio and/or video data from system codec box 209.

In some embodiments, endpoint 103 may include camera 204 (e.g., an HD camera) for acquiring video images of the participant location (e.g., of participant 214). Other cameras are also contemplated. Endpoint 103 may also include display 201 (e.g., an HDTV display). Video images acquired by camera 204 may be displayed locally on display 201 and may also be encoded and transmitted to other videoconferencing endpoints 103 in the videoconference.

Endpoint 103 may also include sound system 261. Sound system 261 may include multiple speakers including left speakers 271, center speaker 273, and right speakers 275. Other numbers of speakers and other speaker configurations may also be used. Endpoint 103 may also use one or more speakerphones 205/207 which may be daisy chained together.

In some embodiments, the videoconferencing endpoint components (e.g., camera 204, display 201, sound system 261, and speakerphones 205/207) may be coupled to the system codec ("compressor/decompressor") box 209. System codec box 209 may be placed on a desk or on a floor. Other placements are also contemplated. System codec box 209 may receive audio and/or video data from a network (e.g., network 101). System codec box 209 may send the audio to speakerphones 205/207 and/or sound system 261 and the video to display 201. The received video may be HD video that is displayed on the HD display. System codec box 209 may also receive video data from camera 204 and audio data from speakerphones 205/207 and transmit the video and/or audio data over network 101 to another conferencing system. The conferencing system may be controlled by participant 214 through the user input components (e.g., buttons) on speakerphones 205/207 and/or remote control 250. Other system interfaces may also be used.

In various embodiments, system codec box 209 may implement a real time transmission protocol. In some embodiments, system codec box 209 may include any system and/or method for encoding and/or decoding (e.g., compressing and decompressing) data (e.g., audio and/or video data). In some embodiments, system codec box 209 may not include one or more of the compressing/decompressing functions. In some embodiments, communication applications may use system codec box 209 to convert an analog signal to a digital signal for transmitting over various digital networks which may include network 101 (e.g., PSTN, the Internet, etc.) and to convert a received digital signal to an analog signal. In various embodiments, codecs may be implemented in software, hardware, or a combination of both. Some codecs for computer video and/or audio may include Moving Picture Experts Group (MPEG), Indeo™, and Cinepak™, among others.

Figure 7A:
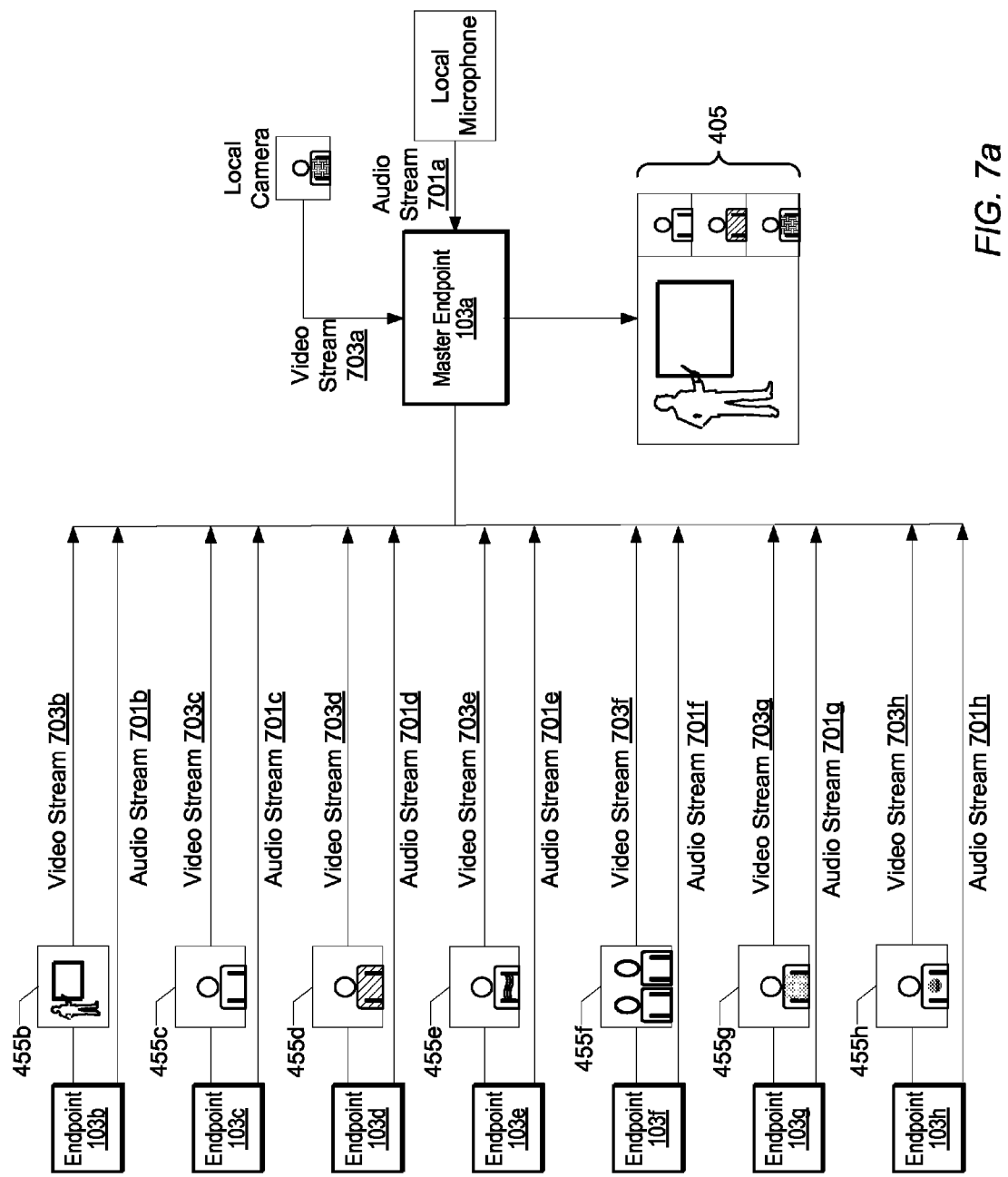

In some embodiments, endpoint 103 may display different video images of various participants, presentations, etc. during the videoconference. Video to be displayed may be transmitted as video streams (e.g., video streams 703b-h as seen in FIG. 7a) between endpoints 103 (e.g., endpoints 103a-h).

Figure 7D:
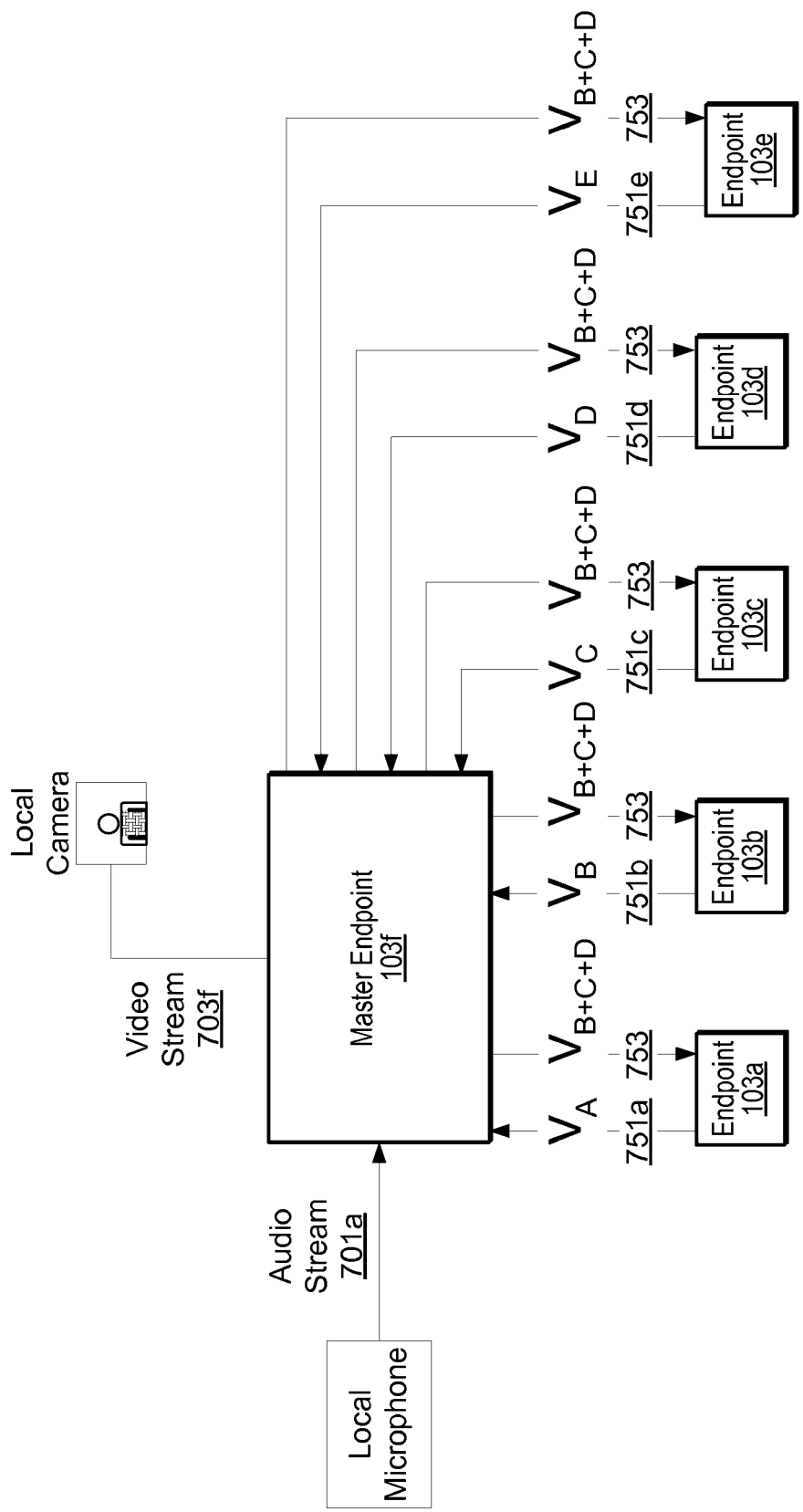

In some embodiments, endpoint 103a (the "master endpoint") may be an MCU or may include MCU functionality (e.g., endpoint 103a may be a standalone MCU or may include embedded MCU functionality). In some embodiments, master endpoint 103a may operate as an MCU during a videoconference and may also be capable of receiving local audio/video from local participants (e.g., through microphones (e.g., microphones in speakerphones 205/207) and cameras (e.g., camera 204) coupled to endpoint 103a). In some embodiments, master endpoint 103a may operate as the "master endpoint", however other endpoints 103 may also operate as a master endpoint in addition to or instead of master endpoint 103a (e.g., endpoint 103f may act as the master endpoint as seen in FIG. 7d).

In various embodiments, master endpoint 103a may form composite video image 405 (e.g., see FIGS. 4a-d) from video streams 703 (e.g., see FIGS. 7a-c) from a selected subset of videoconference endpoints 103 in the videoconference. The master endpoint 103a may send composite video image 405 to other endpoints 103 in the videoconference. In some embodiments, the subset of endpoints 103 that are selected for compositing into composite video image 405 may be selected using criteria such as the last N talking participants. For example, master endpoint 103a may detect which audio streams 701 from the endpoints 103 in the videoconference include human voices and the master endpoint 103 may include a subset (e.g., four) of the endpoints 103 with the detected human voices in the composite video image 405 to be sent to the endpoints 103 in the videoconference. Other criteria may also be used in selecting a subset of endpoints to display. In some embodiments, master endpoint 103a may request non-selected endpoints 103 stop sending video streams 703 to help conserve the resources on master endpoint 103a. In some embodiments, master endpoint 103a may ignore (e.g., not decode) video streams 703 from endpoints 103 that are not being displayed in composite video image 405. In some embodiments, master endpoint 103a may continue to receive audio streams 701 from the endpoints 103 in the conference (both displayed in composite video image 405 and not displayed in composite video image 405) to monitor the audio streams for talking endpoints (and, for example, to form a collective audio stream to send to the endpoints 103 in the videoconference).

In some embodiments, master endpoint 103a may alter composite video image 405 based on talker detection. For example, when a new talker endpoint 103 of the endpoints 103 is detected in audio streams 701, the new talker endpoint 103 may be displayed in composite video image 405 and a currently displayed endpoint 103 in composite video image 405 may be removed (e.g., a currently displayed endpoint 103 with the longest time delay since the last detected voice from that endpoint 103 as compared to the other endpoints 103 displayed in composite video image 405). In some embodiments, master endpoint 103a may make the dominant talker endpoint's video image (e.g., see video image 455b) appear in a larger pane than the other displayed endpoint's video images 455. The dominant talker may be determined as the endpoint 103 with audio including a human voice for the longest period of time of the displayed endpoints 103 or as the endpoint 103 with audio including the loudest human voice. Other methods of determining the dominant talker endpoint are also contemplated.

In some embodiments, displaying only a subset of endpoints 103 in the videoconference (instead of all of the participants) may allow master endpoint 103a to support more endpoints 103 in the videoconference than the number of decoders available on master endpoint 103a. In some embodiments, limiting the number of endpoints 103 displayed concurrently may also reduce visual clutter on displays in the videoconference. In some embodiments, reducing the number of video images 455 (video images 455 used herein to generally refer to video images such as video images 455a, 455b, 455c, and 455d) in composite video image 405 may also allow master endpoint 103a to scale up (e.g., display at an increased resolution) video images 455 in composite video image 405 (instead of, for example, displaying more video images 455 at lower resolutions to fit the video images 455 in the same composite video image 405).

Figure 3:
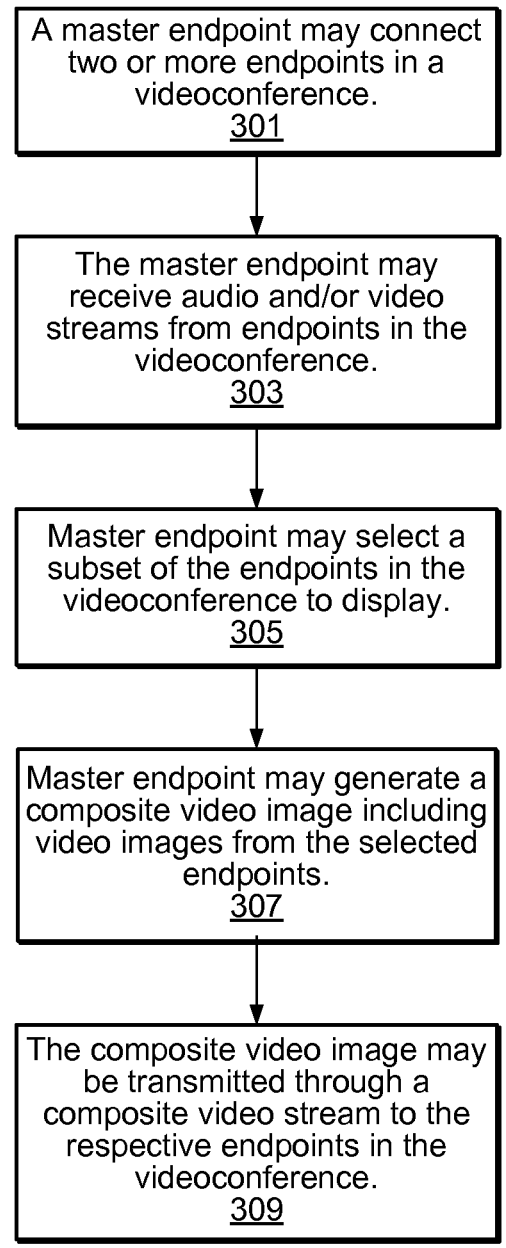
FIG. 3 illustrates a flowchart of a method for conducting a videoconference and compositing a composite video image, according to an embodiment.
Figure 4A:
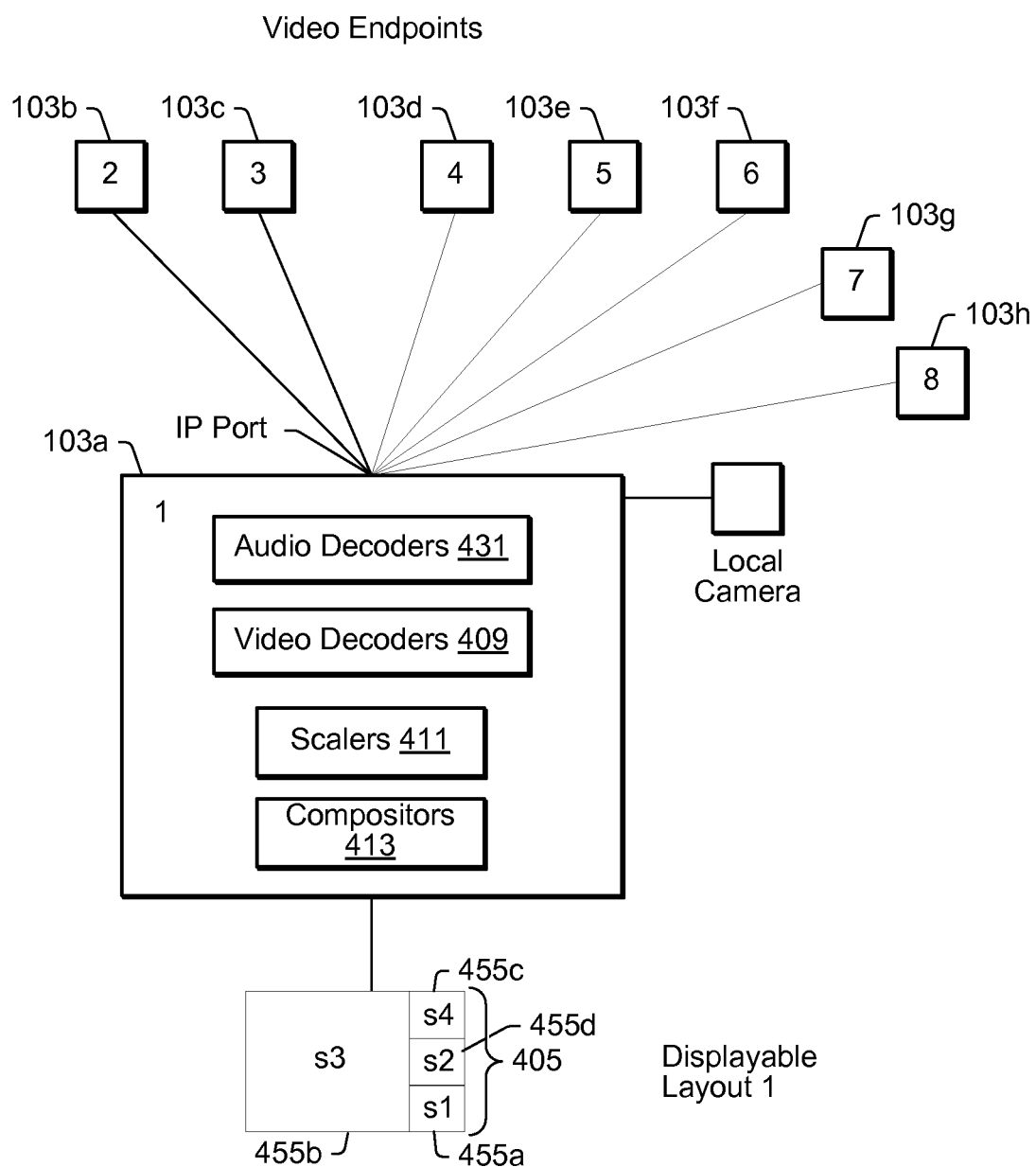
Figure 4B:
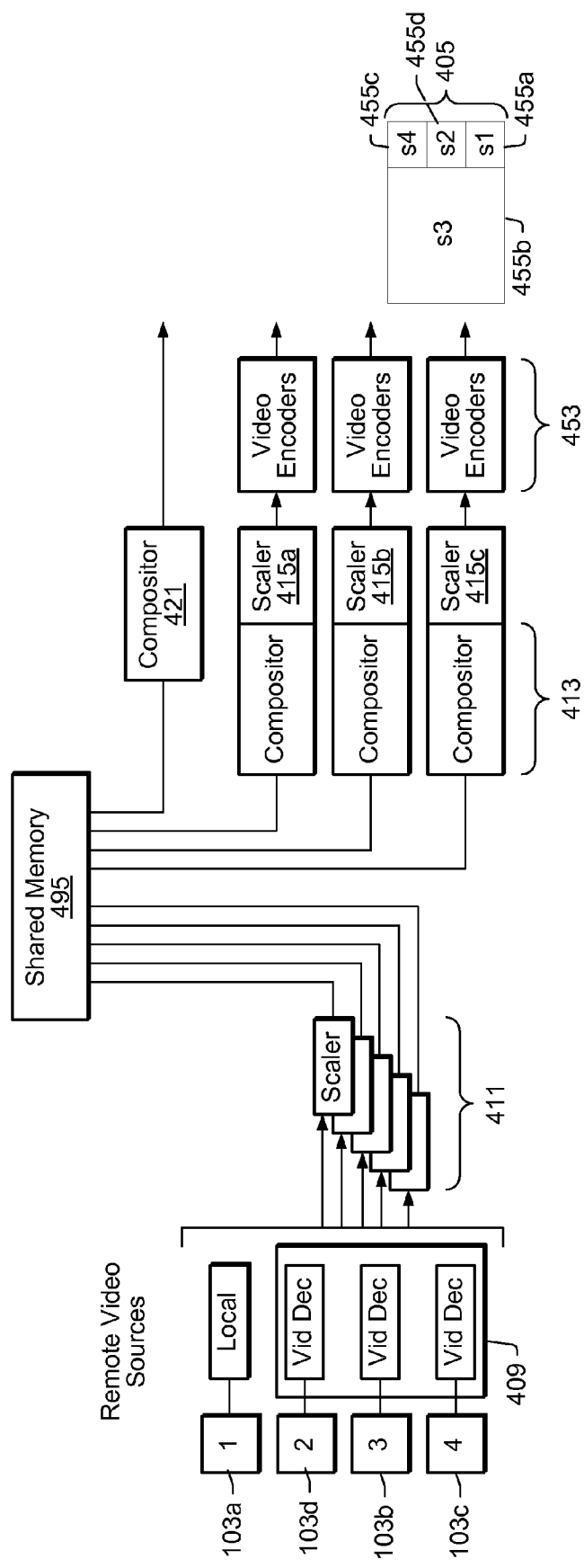
Figure 4D:
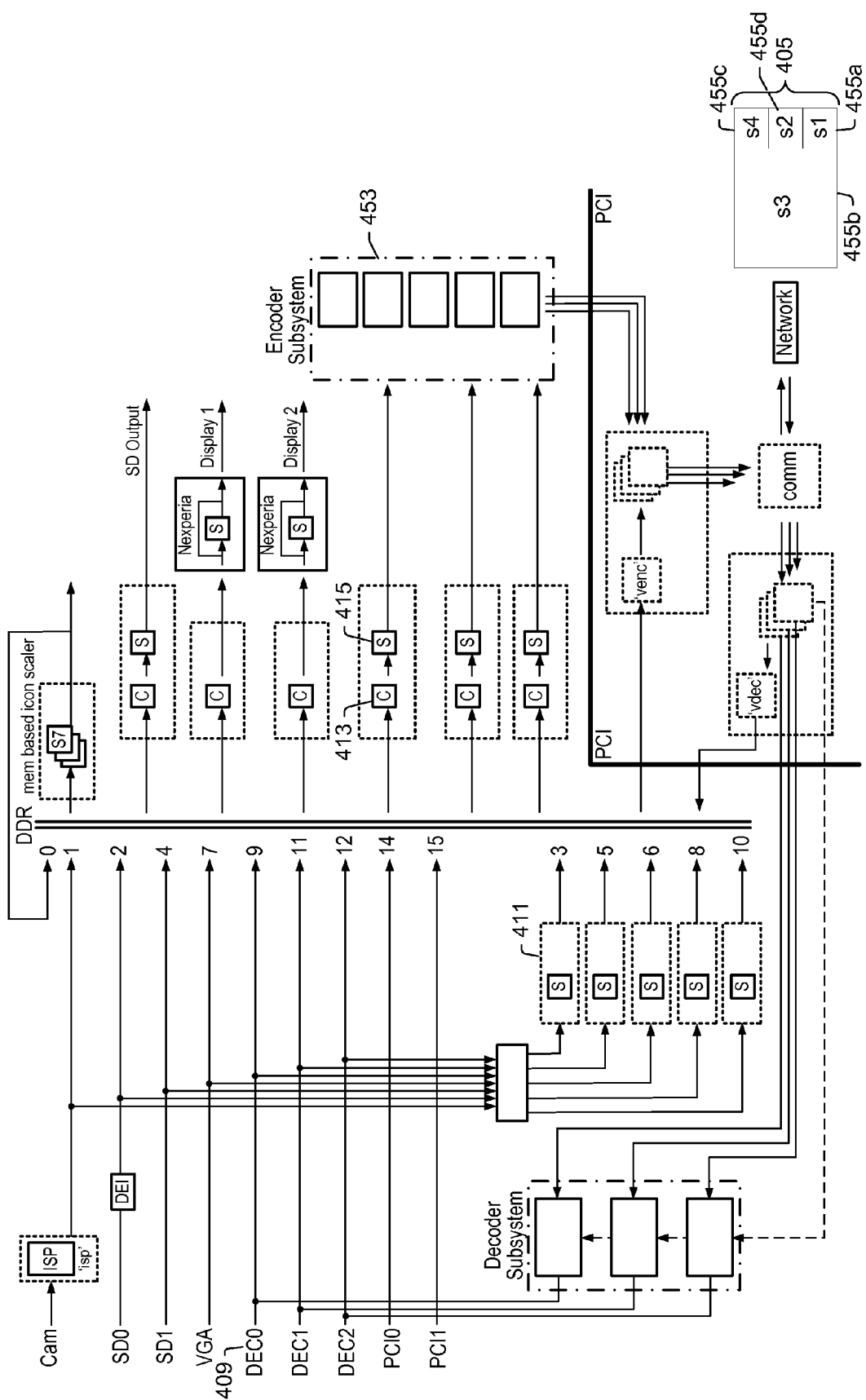

FIG. 3 illustrates a flowchart of a method for conducting a videoconference and compositing composite video image 405, according to an embodiment. It should be noted that in various embodiments of the methods described below, one or more of the elements described may be performed concurrently, in a different order than shown, or may be omitted entirely. Other additional elements may also be performed as desired.

At 301, master endpoint 103a may connect two or more endpoints 103 (e.g., all or a subset of endpoints 103a-h) in a videoconference. In some embodiments, master endpoint 103a may receive call requests from one or more endpoints 103 (e.g., endpoints 103 may dial into master endpoint 103a) to join/initiate a videoconference. Once initiated, master endpoint 103a may send/receive requests to/from other endpoints 103 to join the videoconference (e.g., may dial out to other endpoints 103 or receive calls from other endpoints 103). Endpoints 103 may be remote (e.g., endpoints 103b, 103c, and 103d) or local (e.g., local endpoint 103a including local camera 204). FIGS. 4a-d illustrate embodiments of endpoints 103 connecting to master endpoint 103a for a videoconference.

At 303, master endpoint 103a may receive audio and/or video streams (e.g., audio streams 701 and video streams 703 in FIGS. 7a-c) from endpoints 103 in the videoconference. In some embodiments, master endpoint 103a may include X audio decoders 431 for decoding X number of audio streams 701. Master endpoint 103a may further include Y video decoders 409 for decoding Y number of video streams 703. In some embodiments, master endpoint 103a may decode a larger number of audio streams 701 or video streams 703 than respective numbers of audio decoders 431 or video decoders 409 accessible to master endpoint 103a. In some embodiments, master endpoint 103a may support a videoconference with more endpoints 103 than video decoders 409 because master endpoint 103a may decode only the video streams 703 of endpoints 103 that are to being displayed in composite video image 405 (the selected endpoints). In some embodiments, master endpoint 103a may decode audio streams 701 from each of the endpoints 103 in the videoconference, but the master endpoint 103a may have more audio decoders 431 than video decoders 409. In some embodiments, master endpoint 103a may only decode audio streams 701 from endpoints 103a being displayed in composite video image 405 (and, therefore, may support a videoconference with more endpoints 103 than audio decoders 431 on master endpoint 103a). In some embodiments, master endpoint 103a may decode an audio stream 701 from each endpoint 103 involved in the videoconference.

In some embodiments, audio streams 701 may include audio from microphones at respective endpoints 103. In some embodiments, video streams 703 may include video images 455 from one or more of endpoints 103. Video images 455 may include video (e.g., from camera 204) and/or presentations (e.g., from a Microsoft Powerpoint™ presentation). In some embodiments, master endpoint 103a may use one or more decoders 409 (e.g., three decoders 409) to decode the received video images 455 from respective endpoints 103. For example, video packets for the video frames with the respective received video images 455 may be assembled as they are received (e.g., over an Internet Protocol (IP) port) into master endpoint 103a. In some embodiments, master endpoint 103a may also be operable to receive other information from endpoints 103. For example, endpoint 103 may send data to master endpoint 103a to move a far end camera (e.g., on another endpoint 103 in the call). Master endpoint 103a may subsequently transmit this information to the respective endpoint 103 to move the far end camera.

At 305, master endpoint 103a may select a subset of endpoints 103 in the videoconference to display in composite video image 405. In some embodiments, the subset of endpoints 103 that are selected for compositing into composite video image 405 may be selected according to criteria such as the last N talking participants (other criteria may also be used). For example, master endpoint 103a may use the received audio streams 701 to determine the last N talkers (e.g., the last 4 endpoints 103 that sent audio streams 701 with a human voice from a participant at the respective endpoint 103). Other criteria may also be used. For example, endpoints 103 to be displayed may be preselected. In some embodiments, a user may preselect endpoints 103 from which the master endpoint 103a may select N talkers. In some embodiments, the host and/or chairman of the videoconference may be always displayed in the videoconference. In some embodiments, the audio-only participant endpoints may be ignored in the determination of the subset (e.g., even if an audio-only participant is a dominant voice audio stream, there may be no video stream from the audio-only participant to display in composite video image 405). In some embodiments, multiple criteria may be used (e.g., the host may always be displayed and the remaining spots of composite video image 405 may be used for last N dominant talkers).

In some embodiments, N may be constrained by various criteria. For example, the codec type of the endpoints 103 may affect which endpoint's video may be displayed. In some embodiments, master endpoint 103a may only have the capability to display two endpoints sending H.264 video and two endpoints sending H.263 video. In some embodiments, master endpoint 103a may have two H.264 decoders and two H.263 decoders. In some embodiments, endpoints 103 may provide their codec type and/or video signal type to master endpoint 103a when endpoints 103 connect to the videoconference. Thus, N may be constrained by a maximum number of decoders on master endpoint 103a or may be constrained by a maximum number of codec types available (e.g., N may equal two H.264 decoders plus two H.263 decoders=4 total decoders). The displayed endpoints 103 may be selected based, for example, on the last N talkers of their respective groups (e.g., last two talkers of the H.264 endpoints and the last two talkers of the H.263 endpoints). As endpoints 103 are added/dropped from composite video image 405, video decoders 409 in master endpoint 103 may be reallocated/reassigned as needed based on the codec type needed for the endpoint video streams 703 that are being displayed in composite video image 405. For example, the video decoder 409 decoding a currently displayed video stream to be dropped may be switched to decoding the video stream to be added to composite video image 405. In some embodiments, one decoder may decode multiple video streams and resources within the decoder may be reallocated to decoding the newly displayed video stream.

Figure 10:
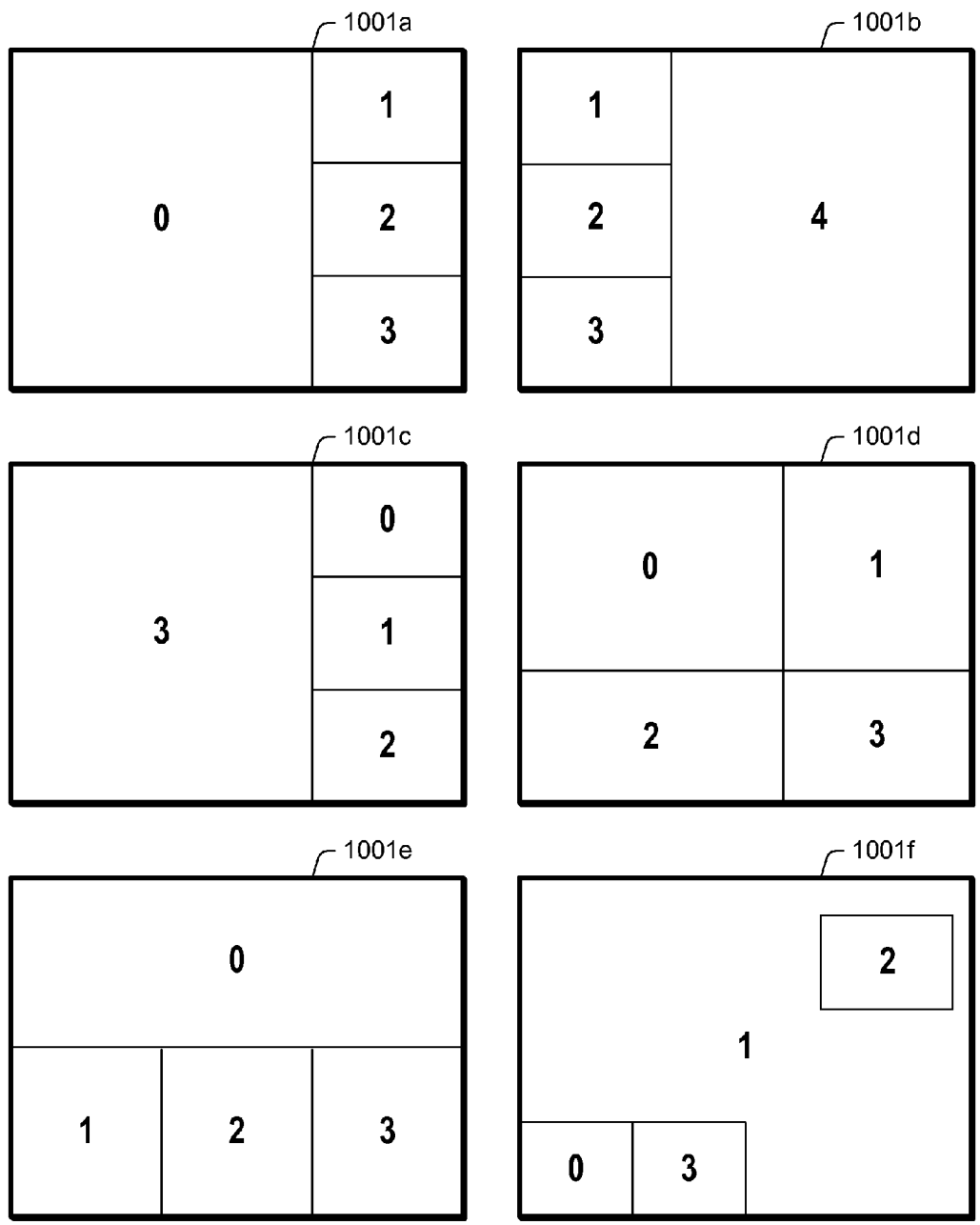
FIG. 10 illustrates various layouts for composite video images, according to various embodiments.

At 307, master endpoint 103a may generate composite video image 405 including video images 455, for example, from the selected endpoints 103. For example, video images 455 may be decoded from video streams 703 from endpoints 103 with the last N talkers for display in composite video image 405. In some embodiments, master endpoint 103a may have one or more scalers 411 (e.g., four scalers) and compositors 413 to scale received video images 455 and composite video images 455 from the selected endpoints 103 into, for example, composite video image 405 (e.g. which may include one or more video images 455 in, for example, a continuous presence layout). Example composite video images 405 are illustrated in FIG. 10 (e.g., composite video images 1001a-f).

In some embodiments, scalers 411 may be coupled to video decoders 409 (e.g., through crosspoint switch 499 shown in FIG. 4c) that decode video images 455 from the various video sources (e.g., endpoints 103). Scalers 411 may scale video images 455 after video images 455 are decoded. In some embodiments, one or more of video images 455 may not be scaled. For example, the two or more video images 455 may be rearranged into composite video image 405 without being scaled. In some embodiments, scalers 411 may be 7-15 tap scalers. Scalers 411 may use linear combinations (e.g., with similar or different coefficients) of a plurality of pixels in video image 455 for each pixel scaled. Other scalers 411 are also contemplated. In some embodiments, video images 455 may be stored in shared memory 495 after being scaled. In some embodiments, scaler 411, compositor 421, compositor 413, and scalers 415 may be included on one or more FPGAs (Field-Programmable Gate Arrays). Other processor types and processor distributions are also contemplated. For example, FPGAs and/or other processors may be used for one or more other elements shown on FIG. 4b.

In some embodiments, compositors 413 may access video images 455 (e.g., from shared memory 495) to form composite video images 405. In some embodiments, the output of compositors 413 may again be scaled (e.g., by scalers 415 (such as scalers 415a, 415b, and 415c)) prior to being encoded by video encoders 453. The video data received by scalers 415 may be scaled according to the resolution requirements of a respective endpoint 103. In some embodiments, the output of compositor 413 may not be scaled prior to being encoded and transmitted to endpoints 103.

In some embodiments, master endpoint 103a may composite video images 455 into the respective video image layouts requested by endpoints 103. For example, master endpoint 103a may composite two or more of received video images 455 into a continuous presence layout as shown in example composite video images 1001a-f in FIG. 10. In some embodiments, master endpoint 103a may form multiple composite video images 405 according to respective received video image layout preferences to send to endpoints 103 in the videoconference.

In some embodiments, displaying a subset of endpoints 103 in the videoconference may allow one or more video decoders 409 on master endpoint 103 to be used in another videoconference. For example, a bridge MCU with 16 video decoders 409 acting as a master endpoint 103a for a 10 participant videoconference may be able to use 4 video decoders 409 to decode/display the last four talkers and use the other 10 video decoders 409 in other videoconferences. For example, the 16 decoder bridge endpoint 103 may support four 10 participant videoconferences by using 4 video decoders 409 for each videoconference. In some embodiments, video decoders 409 may also be reassigned during a videoconference (e.g., to another videoconference, to a different stream type (such as from primary stream to secondary stream), etc).

At 309, composite video image 405 may be transmitted as a video frame through composite video stream 753 (e.g., see FIG. 7d) to respective endpoints 103 in the videoconference. In some embodiments, displaying a subset of endpoints 103 may allow the master endpoint 103a to scale up video images 455 in composite video image 405. For example, the displayed video images 455 may be displayed larger and with more resolution than if all of endpoints 103 in the videoconference were displayed in composite video image 405 (further, each endpoint's video stream 703 may require a video decoder 409 and screen space in composite video image 405). In some embodiments, composite video stream 753 may be sent in different video streams with different attributes (e.g., bitrate, video codec type, etc.) to the different endpoints 103 in the videoconference. In some embodiments, the composite video stream 753 may be sent with the same attributes to each of the endpoints 103 in the videoconference.

Figure 5:
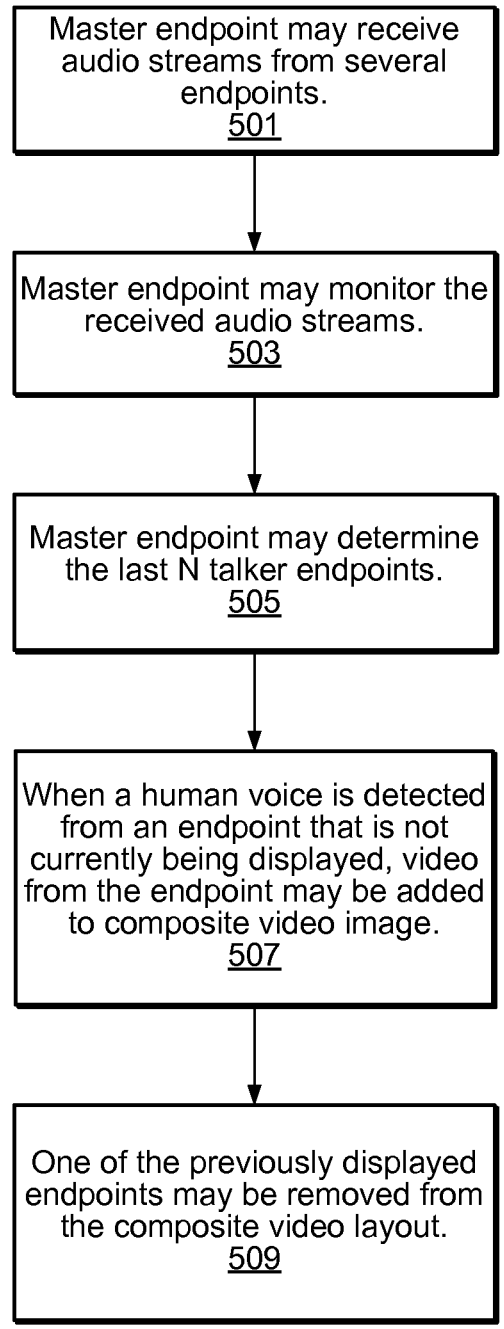
FIG. 5 illustrates a flowchart of a method for conducting a videoconference and selecting last N talkers for a composite video image, according to an embodiment.

FIG. 5 illustrates a flowchart of a method for conducting a videoconference and selecting last N talkers for composite video image 405, according to an embodiment. It should be noted that in various embodiments of the methods described below, one or more of the elements described may be performed concurrently, in a different order than shown, or may be omitted entirely. Other additional elements may also be performed as desired. In some embodiments, a portion or the entire method may be performed automatically.

At 501, master endpoint 103a may receive audio streams 701 from several endpoints 103 in a videoconference. In some embodiments, master endpoint 103a may receive audio streams 701 from each endpoint 103 in the videoconference. For example, as seen in FIG. 7a, master endpoint 103a may receive a local audio stream 701a and audio streams 701b-h from respective endpoints 103b-h.

At 503, master endpoint 103a may monitor the received audio streams 701. In some embodiments, master endpoint 103a may decode audio streams 701 from endpoints 103. Master endpoint 103a may monitor the audio in the decoded audio streams 701 to determine which audio streams 701 may include human voices. For example, human voices in audio streams 701 may be represented by a particular audio pattern (e.g., amplitude over time) and/or frequencies recognizable by audio processing algorithms (e.g., implemented on processors of master endpoint 103a or the other endpoints 103). For example, detected audio energy in a frequency range associated with human voices may be associated with a human voice. In some embodiments, master endpoint 103a may look to an amount of energy in a respective audio signal 701 to determine which audio signals 701 may include a human voice. For example, energy levels in audio signal 701 may be averaged over time and detected levels above the averaged energy level may be associated with a human voice. In some embodiments, a threshold may be predetermined or set by a user (e.g., the threshold may be an amplitude level in decibels of average human voices (e.g., 60-85 decibels) in a conference environment). Other thresholds are also contemplated.

At 505, master endpoint 103a may determine which endpoints 103 include the last N talkers. N may include a default number and/or may be set by a user. For example, a host at master endpoint 103a may specify composite video image 405 should include 4 total endpoints 103 (N=4). In this example, the last four endpoints 103 with detected human voices (or, for example, audio above a threshold) may be displayed in composite video image 405. N may also be dynamic (e.g., N may dynamically adjust to be a percentage of the total number of endpoints 103 participating in the videoconference).

In some embodiments, when audio stream 701 is determined to have a human voice (or is above a threshold, etc.) endpoint 103 associated with audio stream 701 may be associated with a current talker in the videoconference. Other methods of determining which audio streams 701 have a talker may be found in U.S. patent application titled "Controlling Video Display Mode in a Video Conferencing System", Ser. No. 11/348,217, which was filed Feb. 6, 2006, whose inventor is Michael L. Kenoyer which is hereby incorporated by reference in its entirety as though fully and completely set forth herein. In some embodiments, audio stream 701 may be considered to include a participant talking in the videoconference when the audio signal strength exceeds a threshold (e.g., a default or user provided threshold) for energy and/or time (e.g., is louder than a given threshold for at least a minimum amount of time such as 2-5 seconds). Other time thresholds are also possible (e.g., 10 seconds, 20 seconds, etc). In some embodiments, a user may indicate when they are speaking by providing user input (e.g., by pressing a key on a keyboard coupled to the user's endpoint 103). Other talker determinations are also contemplated.

In some embodiments, master endpoint 103*a* may use timers or a queue system to determine the last N talkers (other methods of determining the last N talkers may also be used). For example, when a human voice is detected in audio stream 701 of endpoint 103, video image 455 (e.g., see video images 455*b-h*) of video stream 703 (e.g., see video streams 703*b-h*) for endpoint 103 may be displayed in composite video stream 405 and a timer for endpoint 103 may be started (or restarted if endpoint 103 currently being displayed is a last N talker) (e.g., see timer 601 for endpoint D in FIG. 6*a*). The N endpoints 103 with timers indicating the shortest times (corresponding, therefore, to the most recent talkers) may have their corresponding video image 455 displayed in composite video image 405 (e.g., endpoints 103 in box 603 in FIG. 6*a* and box 605 in FIG. 6*c* for a last 4 talker embodiment). In some embodiments, a time stamp may be noted for an endpoint 103 when a talker is detected and the time to the last time stamp for endpoints 103 may be used to determine the most recent talkers. Other timing methods may also be used. In some embodiments, an indicator for an endpoint 103 with an audio stream 701 associated with a human voice may be moved to the top of a list (e.g., see endpoint D in FIGS. 6*b* and 6*c*) and endpoints 103 previously listed may be lowered on the list by one spot. When a talker is detected in an audio stream 701, an indicator for the corresponding endpoint 103 may be moved to the top of the list (or may remain at the top of the list if it is also the last detected talker). The top N indicated endpoints 103 may be displayed in composite video image 405. Other methods of tracking the current N talker endpoints 103 may also be used. For example, other tracking methods besides a list may be used.

In some embodiments, the master endpoint 103*a* may further determine of the last N talkers which talker is the dominant talker. For example, master endpoint 103*a* may consider the most recent talker the dominant talker, may consider the talker who has been detected speaking longest over a period of time the dominant talker, or may consider the talker who has the most energy detected in their audio signal to be the dominant talker. Other methods of determining the dominant talker are also contemplated. In some embodiments, the dominant talker may be displayed in a larger pane of composite video image 405 than the other displayed video images (e.g., see dominant talker video image 455*b* in composite video image 405 in FIG. 8).

In some embodiments, endpoints 103 that are not being displayed may be instructed by master endpoint 103*a* not to send their video streams 703 to master endpoint 103*a*. For example, as seen in FIG. 7*b*, endpoints 455*e*, 455*f*, 455*g*, and 455*h* may discontinue sending video stream 703. In some embodiments, master endpoint 103*a* may ignore (e.g., not decode) video streams 703 sent by endpoints 103 that are not currently being displayed. For example, as seen in FIG. 7*c*, video streams 703*e*, 703*f*, 703*g* and 703*h* may be ignored by master endpoint 103*a* which may be displaying video images from video streams 703*a* (from the master endpoint's local camera), 703*b*, 703*c*, and 703*d*.

At 507, when a human voice is detected in audio stream 701 that corresponds to an endpoint that is not currently being displayed in composite video image 405, master endpoint 103*a* may add video from the corresponding endpoint to composite video image 405. In some embodiments, the corresponding endpoint's video may no longer be ignored by the compositing master endpoint 103*a* or master endpoint 103*a* may send a message to the corresponding endpoint requesting the endpoint start sending the endpoint's video stream 703 to master endpoint 103*a*. In some embodiments, the most current detected talker endpoint may be displayed in a specific place in composite video image 405 (e.g., in a larger pane than the other displayed endpoints 103). For example, if endpoint 103*b* has the most current detected talker endpoint 103, video image 455*b* from endpoint 103*b* may be displayed in the large pane of composite video image 405 sent to endpoints 103.

In some embodiments, voice detection may occur locally at the respective endpoints 103. For example, endpoints 103 may be instructed (e.g., by master endpoint 103*a*) to start sending their respective video stream 703 (and/or audio stream 701) when the endpoint 103 detects human voices (or, for example, audio over a certain level) from the local audio source (e.g., local microphones). Master endpoint 103*a* may then determine the last N talkers based on when master endpoint 103*a* receives video streams 703 (and/or audio stream 701) from various endpoints 103. In some embodiments, master endpoint 103*a* may send instructions to an endpoint 103 to stop sending its video stream 703 (and/or audio stream 701) if human voices are no longer detected in the audio stream 701 of the respective endpoint 103 and a video stream 703 is being received from a different endpoint 103. Other management schemes for determining the last N talkers are also contemplated.

In some embodiments, statistics and other information may also be displayed in the video images 455 of composite video image 405. For example, participant location, codec type, user identifiers, etc. may be displayed in respective video images 455 of composite video image 405. In some embodiments, the statistics may be provided for all endpoints 103 or only endpoints 103 being displayed in composite video image 405. In some embodiments, the statistics may be sorted on the basis of talker dominance, codec type, or call type (e.g., audio/video).

At 509, one of the previously displayed endpoints 103 may be removed from composite video image 405 (e.g., corresponding to endpoint 103 with the longest duration since the last detected human voice). For example, as seen in FIGS. 6*a*-6*c*, endpoint F may no longer be included in composite video image 405 when endpoint D is added to composite video image 405. In some embodiments, video decoder 409 previously being used to decode the previously displayed endpoint 103 may be reassigned to decode video stream 703 from the most current N-talker endpoint 103 (e.g., just added to composite video image 405). For example, system elements such as video decoder 409, scalers, etc. that were processing the previously displayed endpoint's video stream/audio stream may be dynamically reconfigured to process the video stream/audio stream from the endpoint with the newly detected human voice to be incorporated into composite video image 405. The system elements may be dynamically reconfigured to process, for example, a different resolution, codec type, bit rate, etc. For example, if the previously displayed endpoint 103 had a video stream using H.264 at a resolution of 1280×720, the decoder may be dynamically reconfigured to handle the new endpoint's video stream (which may be using, for example, H.263 and 720×480).

Figure 8:
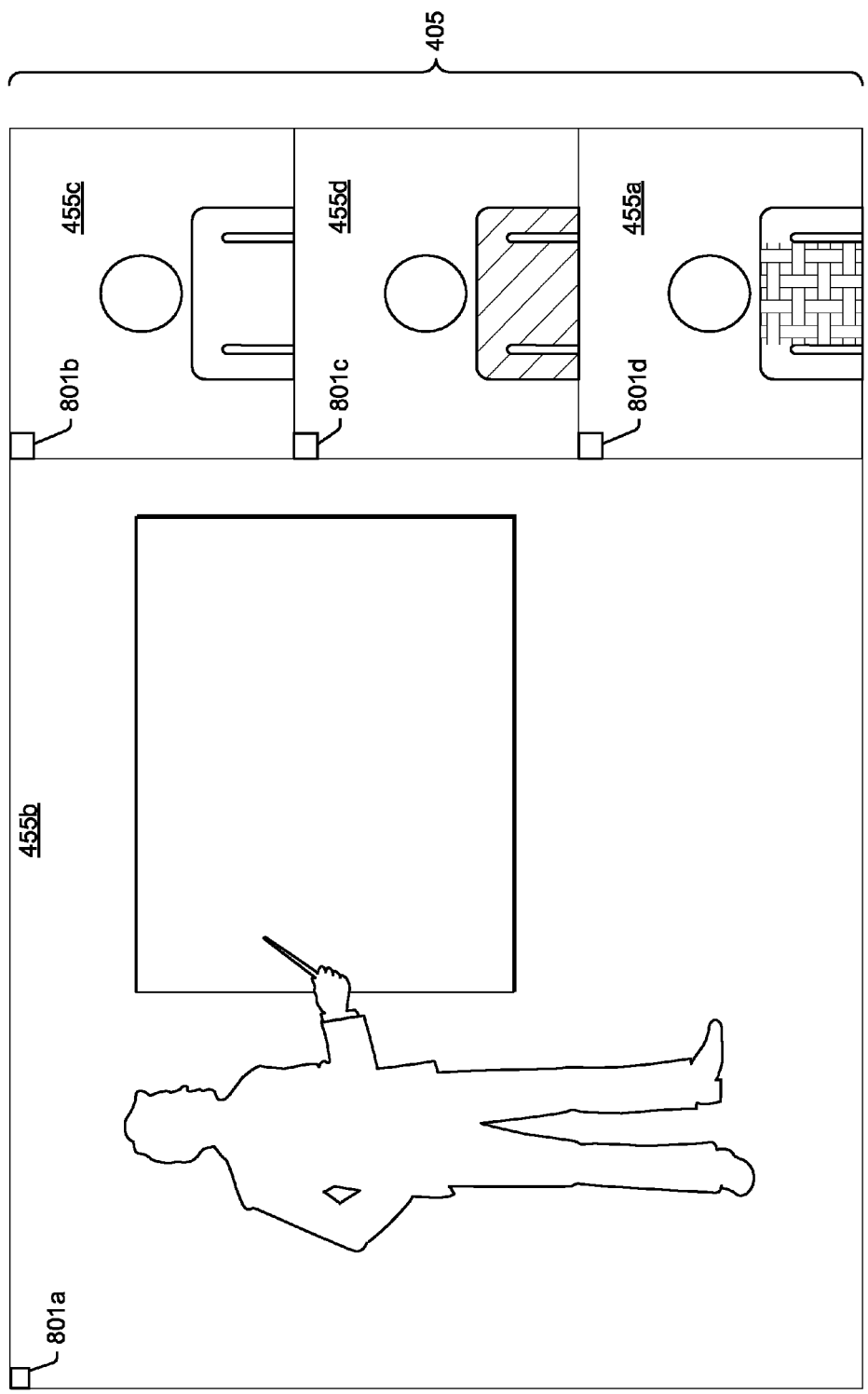
FIG. 8 illustrates a composite video image, according to an embodiment.

FIG. 7d illustrates another example of a master endpoint (e.g., endpoint 103f acting as a master endpoint) processing a subset of video streams 703 from endpoints 103. In some embodiments, master endpoint 103f may receive video streams 751a-e from respective endpoints 103a-e. Master endpoint 103f may composite the three last talkers (e.g., endpoints 103b, c, and d) and send composite video stream 753 to each of endpoints 103a-e. In some embodiments, composite video streams 753 may be sent in H.264 format (other formats are also contemplated). In some embodiments, each endpoint 103a-e may optionally add its local video image (e.g., from a local camera) to composite video image 753 (e.g., using virtual decoders as described in U.S. patent application Ser. No. 12/142,263 incorporated by reference above) for display at each respective endpoint 103. For example, as seen in FIG. 8, coordinate information 801a-d (e.g., the location of pixel coordinates at the corners and/or boundaries of the video images 455 in composite video image 405) may be used to separate the video images 455 and/or insert a local video image in place of one of video images 455a-c, and 455f in composite video image 405.

Figure 9:
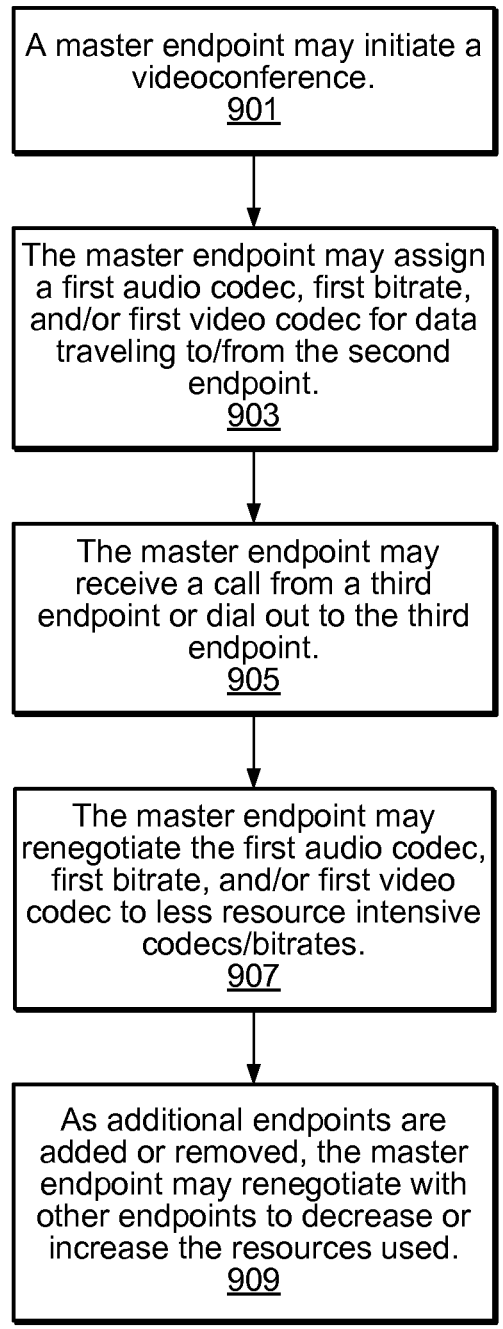
FIG. 9 illustrates a flowchart of a method for renegotiating resources during a videoconference, according to an embodiment.

FIG. 9 illustrates a flowchart of a method for renegotiating resources during a videoconference, according to an embodiment. It should be noted that in various embodiments of the methods described below, one or more of the elements described may be performed concurrently, in a different order than shown, or may be omitted entirely. Other additional elements may also be performed as desired. In some embodiments, a portion or the entire method may be performed automatically.

At 901, master endpoint 103a may initiate a videoconference. For example, a user at master endpoint 103a may initiate the videoconference to a second endpoint 103 or master endpoint 103a may receive a videoconference call request from second endpoint 103 and may set-up the videoconference.

At 903, master endpoint 103 may assign a first audio codec, first bitrate, and/or first video codec for data traveling to/from second endpoint 103.

At 905, master endpoint 103a may receive a call/request from third endpoint 103 to join the videoconference or master endpoint 103a may dial out to third endpoint 103.

At 907, master endpoint 103a may renegotiate the first audio codec, first bitrate, and/or first video codec to a less resource intensive codec/bitrate. For example, master endpoint 103a may renegotiate the first audio codec to a second, less resource intensive, audio codec for second endpoint 103 (e.g., master endpoint 103a may change from a first audio codec which may be a high mips (million instructions per second) wideband audio codec to a low mips narrowband audio codec). In some embodiments, master endpoint 103a may renegotiate the first bitrate to a second, lower, bitrate for data traveling to/from second endpoint 103. In some embodiments, master endpoint 103a may renegotiate the high compute video codec to a second, lower compute, video codec for data traveling to/from second endpoint 103.

At 909, as additional endpoints 103 are added or removed to the videoconference, master endpoint 103a may renegotiate with other endpoints 103 to decrease or increase the resources used. For example, if the third endpoint 103 disconnects from the videoconference, master endpoint 103a may renegotiate the audio codec and/or bitrate for the second endpoint 103 back to a higher resource intensive codec/bitrate.

As an example of the method of FIG. 9, in an embodiment of a six-way videoconference, the audio codecs for the endpoints may be renegotiated as calls/requests to join the current videoconference are received by master endpoint 103a. For example, the videoconference may initially begin with three endpoints 103 (master endpoint 103a and two remote endpoints 103). Master endpoint 103a may have sufficient audio codec processing ability to process audio to/from each of the three endpoints 103 with high quality audio codec functionality. As a fourth endpoint 103 is added to the videoconference, audio to/from the fourth endpoint 103 may be processed using a lower quality audio codec and one of the first three endpoints 103 may be switched to a lower quality audio codec. When a fifth endpoint 103 is added, audio to/from the fifth endpoint 103 may be processed using a lower quality audio codec and one of the remaining two endpoints 103 on a high quality audio codec may be switched to a lower quality audio codec. Finally, as a sixth endpoint 103 is added, audio to/from the sixth endpoint 103 may be processed using a lower quality audio codec and the remaining endpoint 103 on a high quality audio codec may be switched to a lower quality audio codec. In this manner, master endpoint 103a may provide high quality resources (e.g., higher quality audio codec, higher quality video codec, high bitrate, etc.) at the beginning of a videoconference and switch to lower quality resources as needed when additional endpoints 103 are added to the videoconference. This allows high quality resources to be used, for example, when a videoconference has only three endpoints 103 instead of starting each of endpoints 103 on lower quality resources when the number of conference participants is to remain small. Further, in some embodiments, resources may be delegated during the videoconference using other criteria. For example, audio to/from endpoints 103 that do not currently have a human voice may be processed using a lower quality audio codec while the higher quality audio codecs may be used for endpoints 103 that are currently identified as an N talker (e.g., with a detected human voice) being displayed in composite video image 405. The N talker designations may also be used to determine which of the endpoints using higher quality resources will be selected to downgrade to a lower quality resource (e.g., non-talker endpoints may be the first selected for downgrading). Conversely, if an endpoint 103 disconnects from the conference, an N-talker endpoint may be the first selected to upgrade to a higher quality resource.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method, comprising:
utilizing a processor of a videoconferencing system to perform operations including:
receiving an audio stream from each of N remote endpoints that are participating in a videoconference, wherein N is greater than two, wherein the processor has access to M video decoders, wherein M is greater than one and smaller than N;
analyzing the audio streams from the N remote endpoints to maintain a list of the M most recently voice-active endpoints among the N remote endpoints;
receiving M video streams from the M most recently voice-active endpoints respectively;
directing the decoding of the M video streams using respectively the M video decoders to generate M component images respectively;
generating a composite image including at least the M component images;
transmitting the composite image to one or more of the N remote endpoints;
updating the list of M most recently voice-active endpoints to remove a least recently voice-active endpoint and to add a new endpoint in response to detecting current voice activity in the audio stream corresponding to the new endpoint;
signaling the new endpoint to start transmitting a video stream; and
reallocating a first of the M video decoders to the video stream transmitted from the new endpoint.

2. The method of claim 1, wherein M is selected by a user.

3. The method of claim 1, wherein said detecting current voice activity in the audio stream corresponding to the new endpoint includes detecting that a signal strength measure exceeds a threshold.

4. The method of claim 1 further comprising:
signaling said least recently voice-active endpoint to stop video stream transmission.

5. The method of claim 1 further comprising:
analyzing the audio streams corresponding to the M most recently voice-active endpoints to determine an endpoint having a dominant talker, and allocating a larger portion of the composite image to the component image belonging to that endpoint than to others of the M endpoints.

6. The method of claim 1, wherein the processor is included in a master endpoint, wherein the master endpoint receives a local video signal from a local video camera, wherein said generating the composite image includes incorporating a local image derived from the local video signal in the composite image.

7. The method of claim 1 further comprising:
generating a composite audio signal including a mixture of audio information from the N audio streams; and
transmitting the composite audio signal to said one or more of the N remote endpoints.

8. A system for performing multi-way videoconferencing, the system comprising:
a memory that stores program instructions;
a processor configured to execute the program instructions, wherein the program instructions, if executed, cause the processor to:
receive an audio stream from each of N remote endpoints that are participating in a videoconference, wherein N is greater than two, wherein the processor has access to M video decoders, wherein M is greater than one and smaller than N;
analyze the audio streams from the N remote endpoints to maintain a list of the M most recently voice-active endpoints among the N remote endpoints;
receive M video streams from the M most recently voice-active endpoints respectively;
direct the decoding of the M video streams respectively in the M video decoders to generate M component images respectively;
generate a composite image including at least the M component images;
transmit the composite image to one or more of the N remote endpoints;
update the list of M most recently voice-active endpoints to remove a least recently voice-active endpoint and to add a new endpoint in response to detecting current voice activity in the audio stream corresponding to the new endpoint;
signal the new endpoint to start transmitting a video stream; and
reallocate a first of the M video decoders to the video stream transmitted from the new endpoint.

9. The system of claim 8, wherein the integer M is selected by a user.

10. The system of claim 8, wherein said detecting current voice activity in the audio stream corresponding to the new endpoint includes detecting that a signal strength measure exceeds a threshold.

11. The system of claim 8, wherein the program instructions, if executed, further cause the processor to:
signal said least recently voice-active endpoint to stop video stream transmission.

12. The system of claim 8, wherein the program instructions, if executed, further cause the processor to:
  analyze the audio streams corresponding to the M most recently voice-active endpoints to determine an endpoint having a dominant talker, and
  allocate a larger portion of the composite image to the component image belonging to that endpoint than to others of the M endpoints.

13. The system of claim 8, further comprising:
  an input port configured for coupling to a local video camera, wherein the local video camera is configured to generate a local video signal, wherein said generating the composite image includes incorporating a local image derived from the local video signal in the composite image.

14. The system of claim 8, wherein the program instructions, if executed, further cause the processor to:
  generate a composite audio signal including a mixture of audio information from the N audio streams; and
  transmit the composite audio signal to said one or more of the N remote endpoints.

15. The system of claim 8, wherein the M video streams are received via the Internet.

16. The system of claim 8 further comprising an interface for coupling to a local speakerphone.

17. The system of claim 8 further comprising a set of video compressors configured to compress a video signal containing the composite image.

18. A videoconferencing system operable to perform multi-way videoconferencing, the videoconferencing system comprising:
  an audio input;
  a video input;
  a set of M decoders coupled to the video input;
  a memory that stores program instructions;
  a processor configured to execute the program instructions, wherein the program instructions, if executed, cause the processor to:
    receive an audio stream from each of N remote endpoints via the audio input, wherein the N remote endpoints are participants in a videoconference, wherein N is greater than two, wherein the processor has access to the M video decoders, wherein M is greater than one and smaller than N;
    analyze the audio streams from the N remote endpoints to maintain a list of the M most recently voice-active endpoints among the N remote endpoints;
    receive M video streams, via the video input, from the M most recently voice-active endpoints respectively;
    direct the decoding of the M video streams respectively in the M video decoders to generate M component images respectively;
    generate a composite image including at least the M component images;
    transmit the composite image to one or more of the N remote endpoints,
    update the list of M most recently voice-active endpoints to remove a least recently voice-active endpoint and to add a new endpoint in response to detecting current voice activity in the audio stream corresponding to the new endpoint;
    signal the new endpoint to start transmitting a video stream; and
    reallocate a first of the M video decoders to the video stream transmitted from the new endpoint.

19. The videoconferencing system of claim 18, wherein said detecting current voice activity in the audio stream corresponding to the new endpoint includes detecting that a signal strength measure exceeds a threshold.

20. The videoconferencing system of claim 18, wherein the audio streams and the M video streams are received via the Internet.

21. The videoconferencing system of claim 18 further comprising an interface for coupling to a speakerphone.

* * * * *